(12) United States Patent
Jones

(10) Patent No.: US 12,407,729 B2
(45) Date of Patent: Sep. 2, 2025

(54) MONITORING DATA EXFILTRATION BASED ON USER STATUS

(71) Applicant: Sophos Limited, Abingdon (GB)

(72) Inventor: Craig Robert Jones, Carmathen (GB)

(73) Assignee: Sophos Limited (GB)

( * ) Notice: Subject to any disclaimer, the term of this patent is extended or adjusted under 35 U.S.C. 154(b) by 307 days.

(21) Appl. No.: 17/705,749

(22) Filed: Mar. 28, 2022

(65) Prior Publication Data
US 2023/0308485 A1   Sep. 28, 2023

(51) Int. Cl.
*H04L 29/06* (2006.01)
*G06Q 10/1053* (2023.01)
*H04L 9/40* (2022.01)

(52) U.S. Cl.
CPC ......... *H04L 63/20* (2013.01); *G06Q 10/1053* (2013.01); *H04L 63/102* (2013.01); *H04L 63/105* (2013.01)

(58) Field of Classification Search
CPC ..... H04L 63/20; H04L 63/102; H04L 63/105; H04L 29/0685; H04L 29/06945; H04L 29/06836; H04L 29/08936; H04L 47/823; H04L 67/306; H04L 67/75; H04L 63/107; H04L 2463/103; H04L 7/0078; H04L 2012/6424; H04L 41/28; G06Q 10/1053; G06Q 10/063; G06Q 10/0637; G06Q 10/06395; G06Q 2220/10; G06Q 20/382; G06Q 50/265; G06Q 30/0269; G06Q 10/06; H04N 21/2396; H04N 21/83555; H04N 2201/3246; H04N 4/26; H04N 21/4627; H04N 21/64715; H04N 1/00151; H04N 1/4406; H04N 21/25875; H04T 2201/221; H04W 28/095; H04W 72/1257; H04W 36/0038; H04W 48/00; H04W 48/16; H04W 48/08; H01R 13/44; H04B 7/18593; H04M 15/8235; H04M 2215/784; H05K 1/2075; G06F 3/1239; G06F 8/71; G06F 9/468; G06F 9/4451; G06F 11/3438; G06F 11/1004; G06F 21/54; G06F 21/577; G06F 2212/1052; G06F 2221/00; G06F 2221/2113; G06F 17/30091; G06F 17/30171; G06F 19/32; G06F 19/324;
(Continued)

(56) References Cited

U.S. PATENT DOCUMENTS 11,087,014 B2   8/2021  Levy et al.
2017/0093918 A1*  3/2017  Banerjee ............. H04L 41/0895
(Continued)

*Primary Examiner* — Joseph P Hirl
*Assistant Examiner* — Leynna Truvan
(74) *Attorney, Agent, or Firm* — Schmeiser, Olsen & Watts LLP; Victor J. Baranowski, Esq.

(57) ABSTRACT

A method includes storing an employment status module associated with an entity and associating a plurality of employment statuses with respective security settings for a plurality of users associated with the entity, receiving information indicating a change in an employment status of a user of the plurality of users, determining a change to security settings for the user based on the change in the employment status of the user, applying the change to the security settings for the user in a security management system of the threat management facility, and restricting use of at least one data processing electronic device activity on an electronic device of the user based on the change to the security settings for the user.

20 Claims, 13 Drawing Sheets

(58) Field of Classification Search
CPC ..... G06F 2212/7207; G06F 2221/2141; G06F 17/30082; G06F 21/00; G06F 21/30; G06K 7/10257; G09G 2358/00; G01N 33/48792; G03F 77/70483; G03F 7/70491; G01H 2240/101; G10H 2240/105; G11B 20/00144; G11B 20/00804; G02B 27/0093; G05B 2219/32422; G06V 10/235; G06V 40/67; G06G 21/00; Y02B 60/185; Y02B 90/245; Y02D 10/43; Y10S 705/904
See application file for complete search history.

(56) References Cited

U.S. PATENT DOCUMENTS

| | | | | |
|---|---|---|---|---|
| 2019/0319987 | A1* | 10/2019 | Levy | H04L 9/50 |
| 2023/0156009 | A1* | 5/2023 | Al-Essa | H04L 63/102 |
| | | | | 726/4 |
| 2023/0300112 | A1* | 9/2023 | Wood | H04L 63/1416 |
| | | | | 726/22 |

\* cited by examiner

| User 702 | Device(s) 704 | | Entity 706 | Employment 708 | Security Setting 710 | User Setting 712 |
|---|---|---|---|---|---|---|
| User 1 | Device 1 | Device 2 | 1 | Employed | E1 | Low |
| User 2 | Device 1 | | 1 | Departing | D1 | Med |
| User 3 | Device 1 | Device 2 | 1 | Departing | D1 | Low |
| | | | | | D2 | High |
| User 4 | Device 1 | | 2 | Terminated | T1 | High |
| User 5 | Device 1 | | 2 | Employed | E1 | Low |
| User 6 | Device 1 | Device 2 | 2 | Employed | E3 | High |

FIG. 7

MONITORING DATA EXFILTRATION BASED ON USER STATUS

TECHNICAL FIELD

The present disclosure relates to monitoring user policies and security settings for electronic device usage based on a user status. More specifically, this application describes various systems and/or methods for monitoring data exfiltration based on employment status of a user.

BACKGROUND

When a user is asked to leave an employer, there is a non-trivial likelihood that the user may download one or more files from servers maintained by the employer. The user may download his or her own files, but may also download files that include proprietary, confidential, and/or sensitive information. The user may attempt to upload the downloaded files to one or more data exfiltration websites or applications. Thus, an automated computer system, computer program product and method for monitoring user policies and security settings for electronic device usage of a user based on a user status (e.g. an employment status) would be well received in the art.

SUMMARY

According to various embodiments disclosed herein, a method, and associated computer system and computer program product for monitoring user policies and security settings for electronic device usage based on a user status is provided. A computer system at a threat management facility stores an employment status module associated with at least one entity. The employment status module associates a plurality of employment statuses with respective security settings for a plurality of users associated with the at least one entity. The respective security settings relate to data processing electronic device activity by the plurality of users. One or more processors of the computer system receive information indicating a change in an employment status of a user of the plurality of users. The one or more processors of the computer system determine, using the employment status module, a change to security settings for the user based on the change in the employment status of the user. The one or more processors of the computer system apply the change to the security settings for the user in a security management system of the threat management facility. The method, associated computer system and computer program product then provides for restricting use of at least one data processing electronic device activity on an electronic device of the user based on the change to the security settings for the user.

BRIEF DESCRIPTION OF THE DRAWINGS

The above and further advantages of the foregoing may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the disclosed concepts and features.

FIG. 7 depicts a policy management table according to an example embodiment.

DETAILED DESCRIPTION

Figure 1:
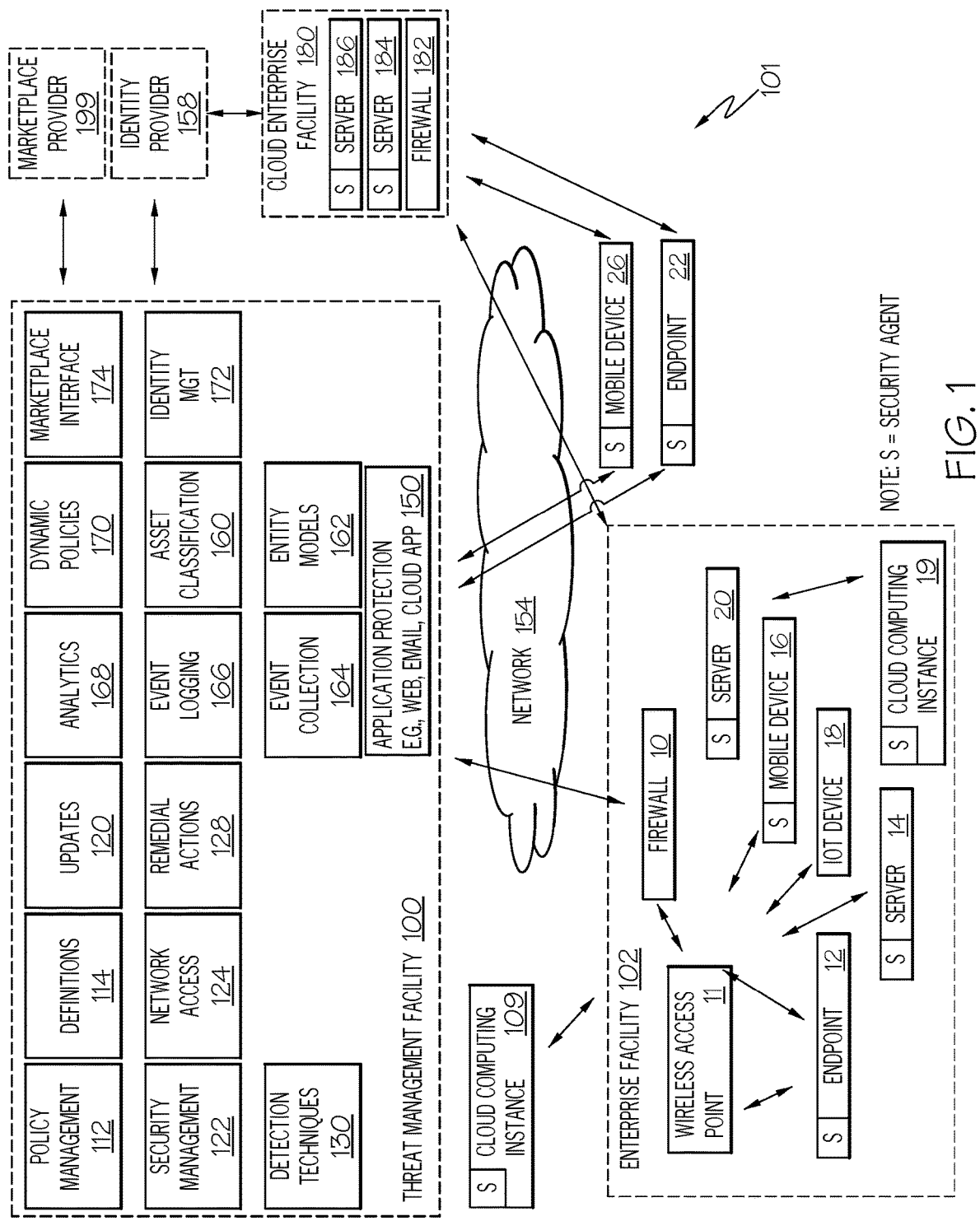
FIG. 1 depicts a block diagram of a threat management facility according to an example embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The disclosed concepts and features are described in more detail with reference to exemplary embodiments thereof as shown in the accompanying drawings. While the various concepts and features are described in conjunction with various embodiments and examples, it is not intended that the concepts and features are limited to such embodiments. On the contrary, the various concepts and features encompasses various alternatives, modifications and equivalents, as will be appreciated by those of skill in the art. Those of ordinary skill having access to the concepts described herein will recognize additional implementations, modifications and embodiments, as well as other fields of use, which are within the scope of the present disclosure as described herein.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

Embodiments herein are directed to monitoring and alerting a system administrator to the possibility of data exfiltration based on the employment status of a user or employee. In general, a client device (e.g. an endpoint) includes a security or monitoring agent that monitors data movement on the client device. The monitoring agent described herein may be configured to monitor installed programs and/or websites visited by the user of the client device. In particular, the monitoring agent may monitor websites and applications that support the uploading of data from the client device (e.g., websites, and/or applications that support data exfiltration). Examples of such websites and applications include Microsoft OneDrive, Google Drive, Carbonite, Box, DropBox, and the like. When a user is asked to leave an employer, or there is some other status change to the user, the monitoring agent may be informed of the change in the user's status. The monitoring agent may then alert an administrator of the client device if and when the user is attempting to upload information which may be classified by the employer as proprietary, confidential and/or containing sensitive information. In some instances, the monitoring agent may be configured to allow the data exfiltration websites prior to a change in the user's status (e.g. employment status). However, after the change to the user's status, the same data exfiltration websites may be blocked or prohibited. Various embodiments relating to monitoring user policies and security settings for electronic device usage based on a user status will be described herein.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more according to an example embodiment. The threat management facility 100 may communicate with, coordinate, and control operation of security functionality at different control points, layers, and levels within the system 101. A number of capabilities may be provided by the threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats or unwanted activity. In embodiments, the threat management facility 100 may provide protection from a variety of threats or unwanted activity to an enterprise facility that may include a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or TOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. A marketplace provider 199 may be selected from a number of providers in a marketplace of providers that are available for integration or collaboration via the marketplace interface facility 174. A given marketplace provider 199 may use the marketplace interface facility 174 even if not engaged or enabled from or in a marketplace. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with a cloud enterprise facility 280. The cloud enterprise facility may include one or more cloud applications, such as a SaaS application, which is used by but not operated by the enterprise facility 102. Exemplary commercially available SaaS applications include Salesforce, Amazon Web Services (AWS) applications, Google Apps applications, Microsoft Office 365 applications and so on. A given SaaS application may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

The cloud enterprise facility 280 may include servers 284, 286, and a firewall 282. The servers 284, 286 on the cloud enterprise facility 280 may run one or more enterprise or cloud applications, such as SaaS applications, and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications and cloud enterprise facilities 280, or, for example, a SaaS application may be deployed on a cloud enterprise facility 280.

In embodiments, aspects of the threat management facility 100 may be provided as a stand-alone solution. In other embodiments, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In an embodiment, the policy management facility 112 and the security facility 122 may work in concert with the update management facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

While the above description of the threat management system 101 describes various threats typically coming from a source outside the enterprise facility 102, it should be understood that the disclosed embodiments contemplate that threats may occur to the enterprise facility 102 by the direct actions, either intentional or unintentional, of a user or employee associated with the enterprise facility 102. Thus, reference to threats hereinabove may also refer to instances where a user or employee, either knowingly or unknowingly, performs data exfiltration from the enterprise facility 102 in a manner that the enterprise facility 102 wishes to prevent.

Figure 2:
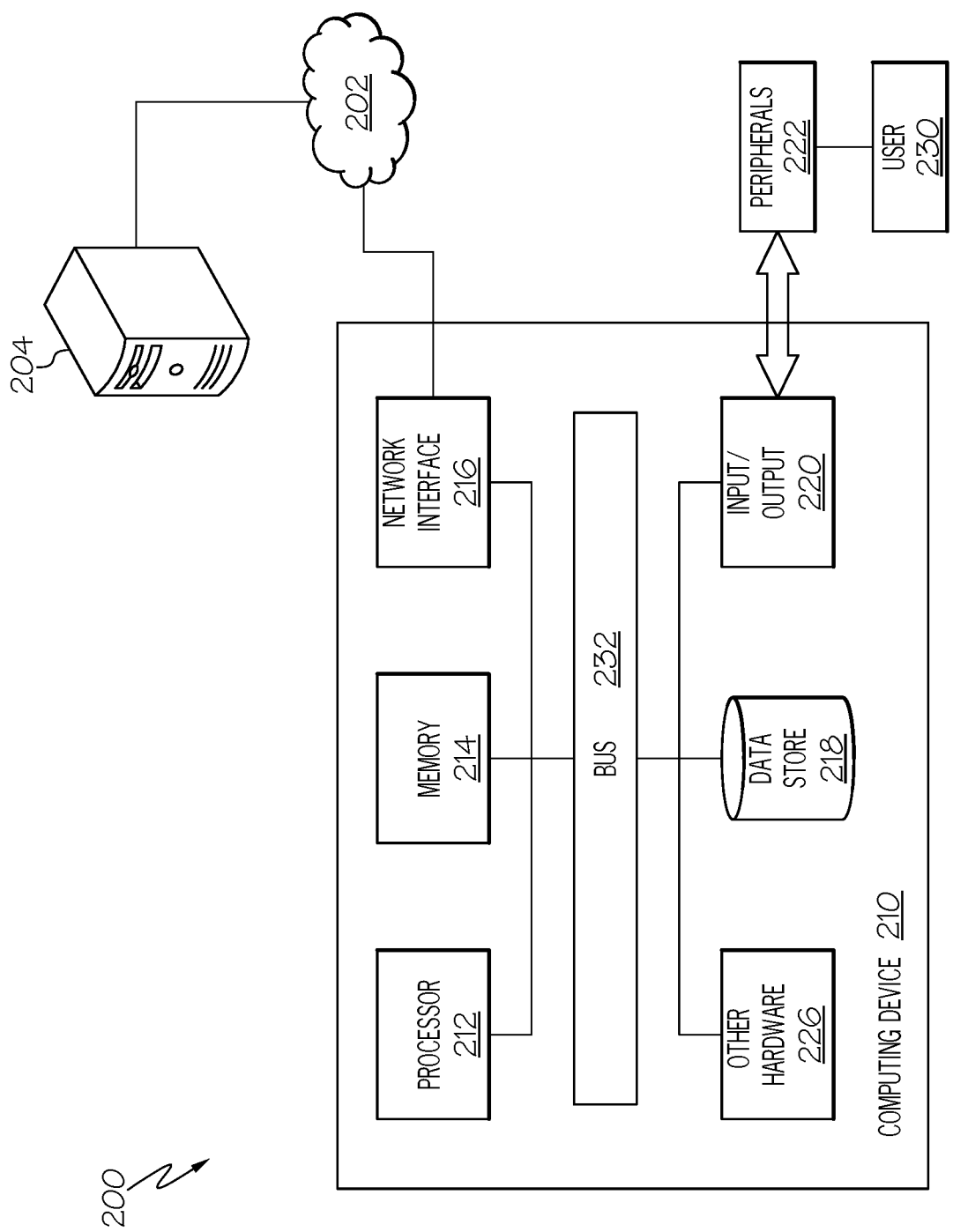
FIG. 2 depicts a computer system according to an example embodiment.

FIG. 2 illustrates a computer system according to an example embodiment. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may provide a physical or virtual device as a platform for any of the entities described in the threat management environment above with reference to FIG. 1. For example, the computing device 210 may be a server, a client, a threat management facility, or any of the other facilities or computing devices described therein. In certain aspects, the computing device 210 may be implemented using hardware (e.g., in a desktop computer), software (e.g., in a virtual machine or the like), or a combination of software and hardware (e.g., with programs executing on the desktop computer). The computing device 210 may be a standalone device, a device integrated into another entity or device, a platform distributed across multiple entities, or a virtualized device executing in a virtualization environment.

The network 202 may include the network 105 described above, which may be any data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.), fifth generation cellular technology (e.g., 5G), WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and may generally be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random-access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or communications through any other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, 5G, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

The computer system 200 may include a peripheral 222 for the computing device 210 such as any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control of or communications with other devices or components. Other I/O devices suitable for use as a peripheral 222 include haptic devices, three-dimensional rendering systems, augmented-reality displays, magnetic card readers, and so forth. In one aspect, the peripheral 222 may serve as the network interface 216, such as with a USB device configured to provide communications via short range (e.g., Bluetooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid-state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Figure 3:
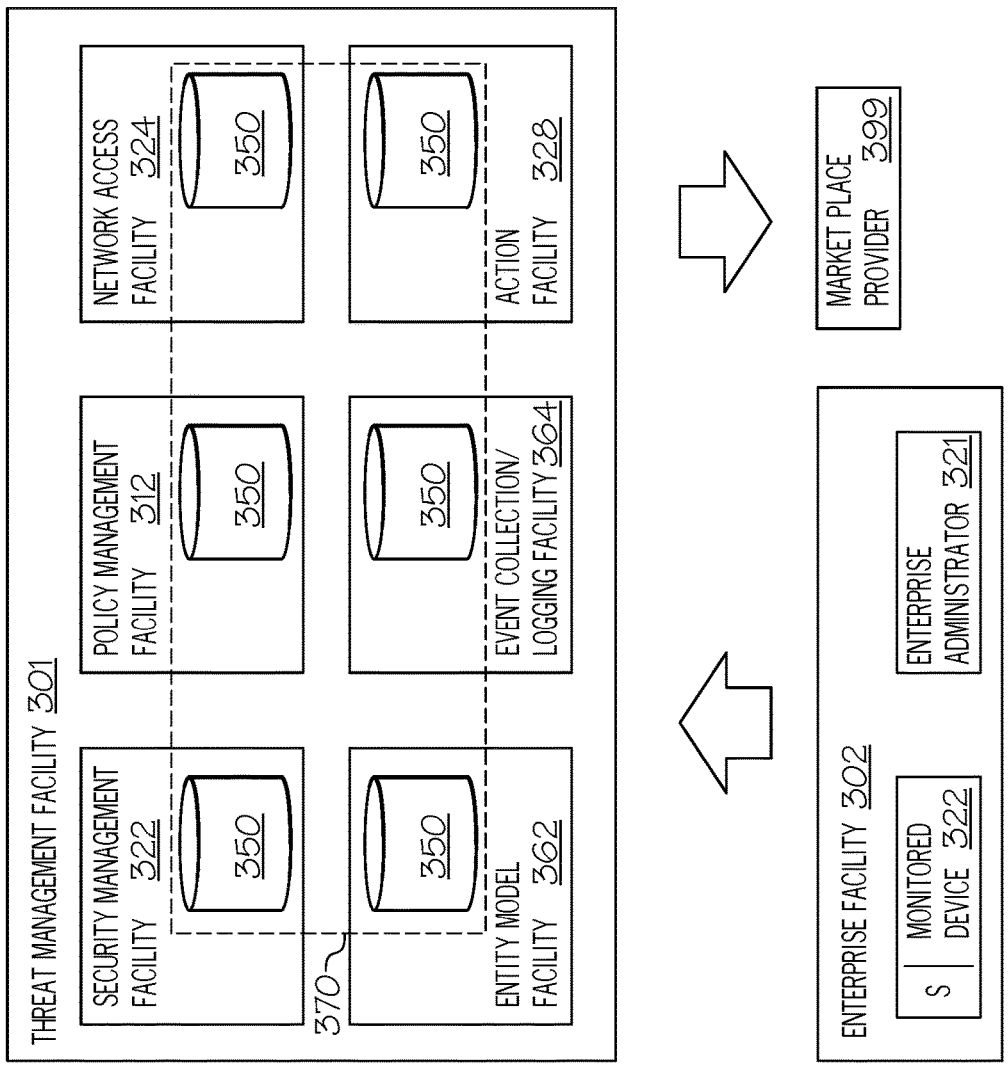
FIG. 3 depicts a system for monitoring user policies and security settings for electronic device usage based on a user status according to an example embodiment.

FIG. 3 depicts a system 300 for monitoring user policies and security settings for electronic device usage based on a user status according to an example embodiment. The system 300 includes a threat management facility 301 which may include some or all of the features of the threat management facility 100 described previously. As shown, the threat management facility 301 includes several of the sub-facilities shown in FIG. 1 and described previously, such as a security management facility 322 (similar or the same as the security management facility 122), a policy management facility 312 (similar or the same as the policy management facility 112), a network access facility 324 (similar or the same as the network access facility 124), an entity model facility 362 (similar or the same as the entity model facility 162), an event collection and/or logging facility 364 (similar or the same as the combination of the event collection facility 164 and the event logging facility 166), and an action facility 328 (similar of the same as the remedial action facility 128). Each of the sub-facilities 322, 312, 324, 362, 364, 328 may include one or more data repositories 350 for retaining data associated with a respective facility.

As shown, the threat management facility 301 includes an employment status module 370 which is shown as a system which is in operable communication with the various sub-facilities 322, 312, 324, 362, 364, 328. In particular, the employment status module 370 may collect data from the various data repositories 350 of the sub-facilities 322, 312, 324, 362, 364, 328 for usage in accordance to the principles described herein. Likewise, the employments status module 370 may leverage the functionality of the various sub-modules 322, 312, 324, 362, 364, 328 in order to perform responsive actions in light of changes to employment status of users associated with the threat management facility 301 (users of an enterprise facility, for example).

The threat management facility 301 may further receive data from, and send data to, various other systems such as enterprise facility 302, including a managed device 322 having a monitoring agent S, and an enterprise administrator 321. It should be understood that while only one managed device 322 and enterprise administrator 321 is shown, the enterprise facility can comprise any number of endpoints, devices administrators and the like, such as the endpoints 10-26 shown in FIG. 1. Moreover, the threat management facility 301 may send data to, and receive data from, marketplace provider 399, such as a human resources software application provider or service.

The employment status module 370 may include one or more computer systems having one or more computer processors configured to execute instructions for performing a methodology as described herein. In particular, the employment status module 370 may be configured to associate respective security settings for a plurality of users of electronic devices, such as the monitored device 322, with employment statuses of the users. The employment status module 370 may receive information from one or more sources indicating a change in employment status for a user, and use this received information to determine a change in security settings, automatically and/or responsive to receiving the information. The employment status module 370 may further be configured to apply the change in security settings, and then use the change to restrict electronic device usage of the user based on the change to the security settings of the user.

The employment status module 370 may further be configured to deploy and interact with a monitoring agent, such as the monitoring agent S, on a device operated by a user. The monitoring agent may be configured to monitor and/or control device usage by the user, with the direction of the employment status module 370 and instructions therefrom. The employment status module 370 may be configured to control the monitoring agent based on the employment status of the user and associated security settings as determined by the employment status.

To accomplish the above-described functionality, the employment status module 370 may communicate with the security management facility 322, which may be a sub-facility of the threat management facility 301. The security management facility 322 may incorporate services related to reviewing and analyzing and processing the information received from the monitoring or security agent S. The security management facility 322 may further be utilized in interacting with other endpoints (not shown) of the enterprise facility 302, such as firewalls or the like, as part of the restriction or actions taken in response to a change in security settings or monitoring status resulting from an employment status change for a user.

The employment status module 370 may further communicate with the policy management facility 312. The policy management facility 312 may manage rules or policies, permissions and the like, associated with individual devices and users. Blacklist (e.g., a block list) and whitelist (e.g., an allowed list) policies related to application permissions and the like may be associated with user policies and generated, stored and updated by the policy management facility 312. Resources from the policy management facility 312 may be leveraged in order to generate the key rules or associations underlying the employment status module 370 related to the association of security settings with employment status for users. Thus, the employment status module 370 may provide the resources allowing the employment status module 370 to dynamically and immediately respond in real time to changes in employment status with corresponding changes to security settings. The policy management facility 312 may originate and/or push information to the monitored device 322, the enterprise administrator 321 or any other device or endpoint of the enterprise facility 302.

The employment status module 370 may communicate with the network access facility 324. The network access facility 324 may be used to keep track of blacklists (e.g., the block lists), whitelists (e.g., the allowed lists), for network access requests made by user devices. These network access requests may be separate from the application permissions accounted for by the policy management facility 312. In other embodiments, these different categories of blacklist and whitelist information or data may be combined into a single repository or database related to devices usage, network access, and the like.

The employment status module 370 may communicate with the entity model facility 362. The entity model facility 362 may contain group-related information associated with particular entities such as the enterprise facility 302. The threat management facility 301 may be configured to manage threats and user status in the manner described herein on more than one entity (i.e. enterprise facility) simultaneously. The entity model facility 362 may contain entity-specific rules which may be used by the employment status module 370 in applying rules or algorithms in determining security settings based on employment status.

The employment status module 370 may communicate with the event collection and logging facility 364. As described with respect to FIGS. 6 and 8, the event logging facility 364 may include resources for receiving events, event streams, event vectors and the like, and processing and storing this information in the employment status module 370, and in the various sub-facility data repositories 350 as needed so that the employment status module 370 may be capable of using received information in updating security settings and monitoring status based on employment status.

The employment status module 370 may communicate with the action facility 328. The action facility 328 may facilitate the interactions of the employment status module 370 with the various monitored devices (i.e. the monitoring or security agents associated therewith), enterprise administrators of an enterprise facility associated with the monitored devices and monitored users, or other endpoints of the enterprise facility. For example, other endpoints may include routers, switches, firewalls or other devices or virtual devices which are included in the enterprise facility and can be leveraged to enable the security settings determined by the employment status module 370. For example, it is possible that security settings associated with a particular user could require instructions or settings to be changed in a firewall of the enterprise facility. Whatever the action, the action facility 328 may be utilized to accomplish the policy changes described herein.

Figure 4:
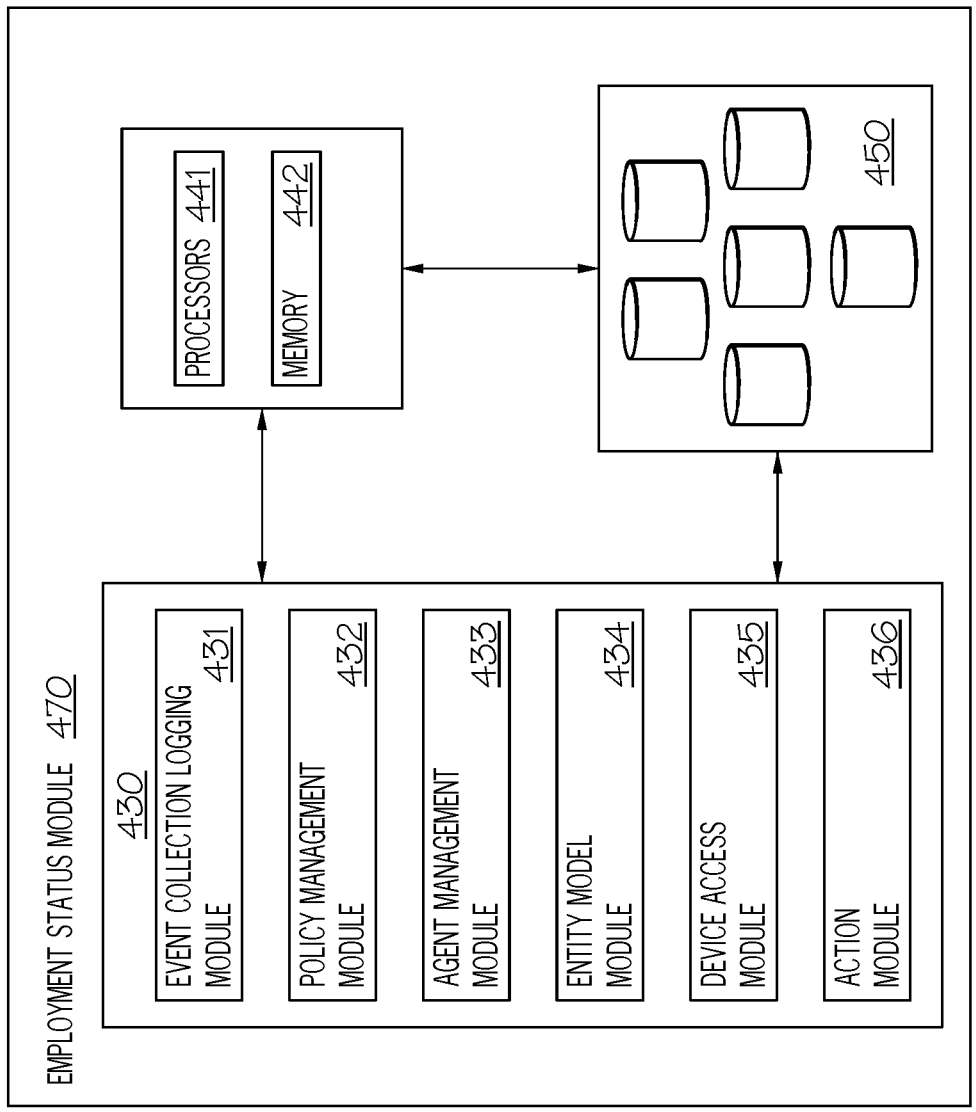
FIG. 4 depicts an employment status module according to an example embodiment.

FIG. 4 depicts an employment status module 470, which may comprise one or more computer systems in accordance with an example embodiment. Embodiments of the computer system may include a module structure 430 that includes one or more modules or sub-modules, including an event collection and logging module 431, a policy management module 432, an agent management module 433, an entity model module 434, a device access module 435 and an action module 436. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system. A module (whether hardware, software, or a combination thereof) may be designed to implement or execute one or more particular functions or routines. While the module structure 430 as a single entity, it should be understood with reference to FIG. 3, that the resources embodied by the computer system of the employment status module 470 and module structure 430 thereof may be found across a larger facility architecture having many sub-facilities contributing resources and/or information to the module structure 430.

Embodiments of the event collection and logging module 431 may include one or more components of hardware and/or software program code for receiving, processing and/or storing information indicating a change in an employment status of a user. This information may be received from various sources, including administrators of an enterprise facility or threat management facility, or from a marketplace provider, such as a third party human resources system or service associated with an enterprise facility. The employment status information may also be received directly from a monitored device (i.e. from a monitoring agent operable thereon).

The event collection and logging module 431 may further be configured for receiving, from a monitoring agent deployed on a monitored device, information related to device usage of the electronic device by the user. This type of device usage may relate to application usage, website usage, application installation or any other type of device usage which might be relevant in setting security settings. This information may further include information indicating the user has downloaded sensitive or confidential information from a repository associated with the at least one entity. Still further, the monitoring agent may be configured to provide information related to when the user attempts to perform data exfiltration with the electronic device, or access an application or website which allows for data exfiltration. Thus, the received information from the monitoring agent may relate to or include data flow information to and from the electronic device of a user.

Figure 6:
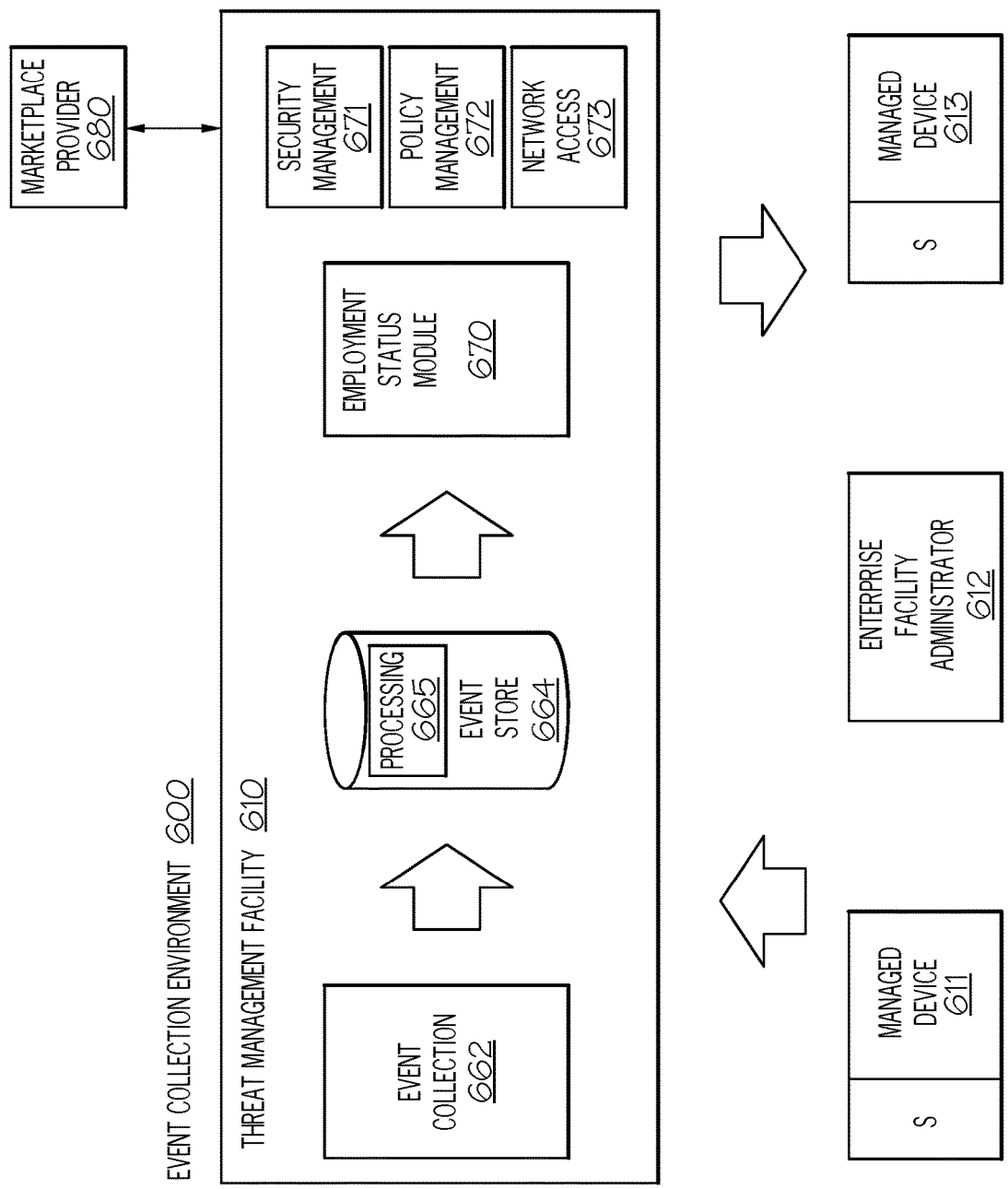
FIG. 6 depicts an event collection environment according to an example embodiment.
Figure 8:
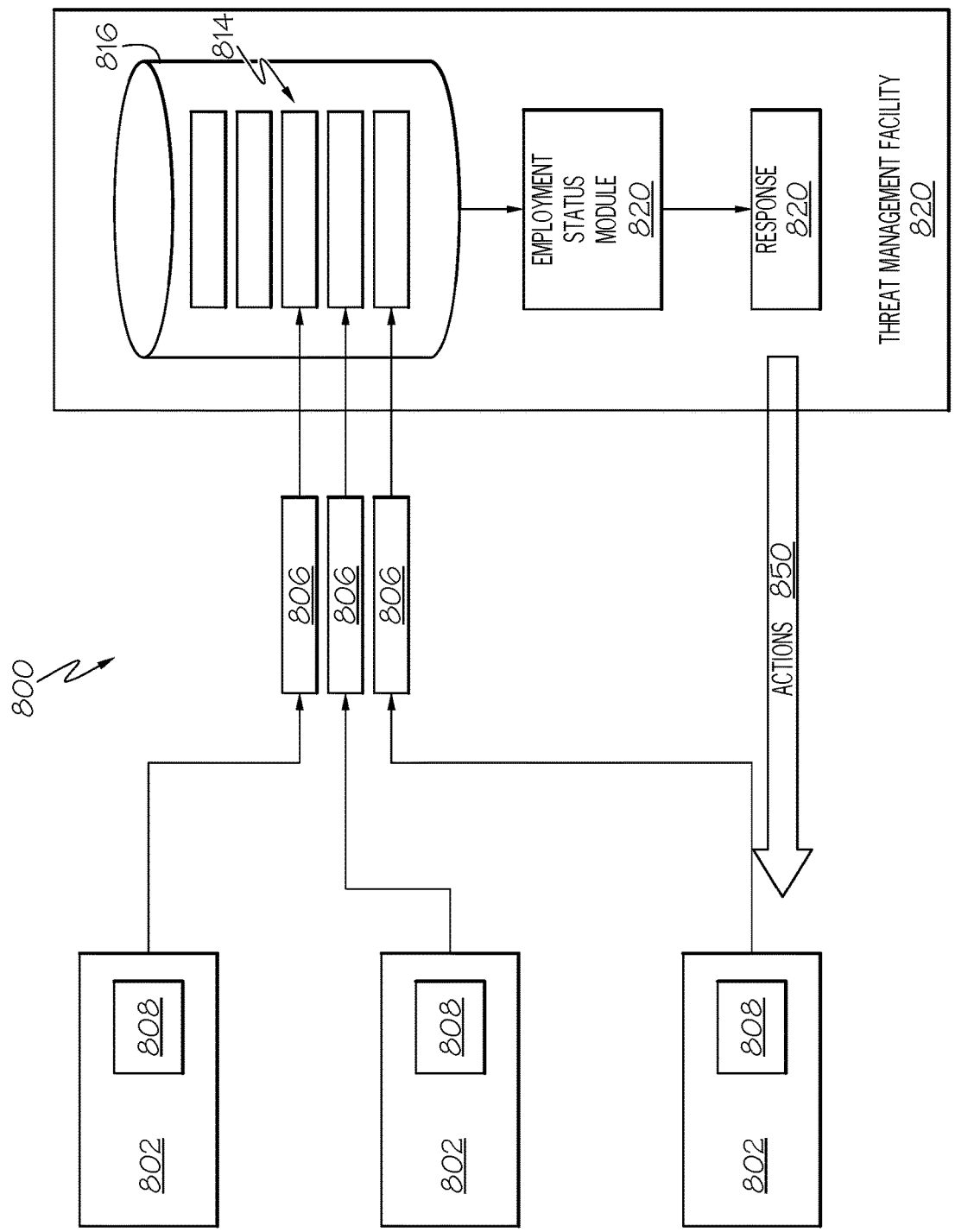
FIG. 8 depicts a system for monitoring user status and response according to an example embodiment.

The received information by the event collection and logging module 431 may be considered "events" as described herein, and may be received and processed by the event collection and logging module 431 according to the principles described in FIGS. 6 and 8.

Embodiments of the policy management module 432 may include one or more components of hardware and/or software program code for determining a change to security settings for the user based on the change in the employment status of the user. Generally, the policy management module 432 of the employment status module 470 may include the analysis engine, logic, algorithms, ruleset, or model for providing the determinations and/or predictions made by the employment status module 470. The policy management module 432 may further be configured to initiate the applying of changes to the security settings for the user in a security management system of the threat management facility based on these determinations.

The policy management module 432 may be configured to further escalate or increase a level of monitoring of a user based on received information from a monitoring agent of a monitored device of a user. This monitoring status or other type of user status of the user may not alone preclude the user from engaging in activity, but may be driven by a determination by the policy management module 432 based on received information that enhanced monitoring of a user or monitored device is appropriate.

Thus, the policy management module 432 may be configured to process updates in employment status of users and change the security settings for the user based on predetermined rules, logic, algorithms, logic or models.

In some embodiments, the policy management module 432 may deploy one or more machine learning models, described with reference to FIGS. 9 and 13. Machine learning models of the policy management module 432 may be configured to predict a likelihood of one or more of the plurality of users to attempt to perform unauthorized data exfiltration and suggest a restriction for data processing activity for the one or more of the plurality of users to an administrator of the at least one entity based on the prediction. Machine learning models may further be configured to suggest or deploy a user policy, security settings, or the like, based on predictions output.

Embodiments of the agent management module 433 may include one or more components of hardware and/or software program code for deploying and controlling one or more monitoring agents on endpoints associated with a client or enterprise facility (i.e. "monitored devices"). Thus, the agent management module 433 may be configured to deploy a monitoring agent on an electronic device of a user of the plurality of users such that the monitoring agent is capable of monitoring device usage of the electronic device and providing information back to the employment status module 470 related to the monitored device usage. The agent management module 433 may be configured to control the monitoring agent based on an employment status of the user and security settings for the user as determined using the employment status model 470 and the policy management module 432 thereof. The agent management module 433 may be configured to inform and/or apply changes to the monitoring agent that correspond to changes to the security settings for the user. Thus, the agent management module 433 may generally be configured to deploy, interact with, update and send and receive information with the monitoring agent of a monitored device.

Embodiments of the entity model module 434 may include one or more components of hardware and/or software program code for maintaining entity-specific data for application by the rules, logic, algorithms, logic or models of the policy management module 432. Thus, the employment status module 470 may be configured to be deployed and operable for monitoring many entities simultaneously. The entity model module 434 may store and maintain the data associated with entity specific security settings, user classifications, and the like.

Embodiments of the device access module 435 may include one or more components of hardware and/or software program code for storing and maintaining information related to blacklists, whitelists and the like. Thus, the device access module 435 may be configured to maintain a list of applications and websites. This list or data may be utilized by the policy management module 432 in obtaining respective security settings for each of the plurality of employment statuses include settings for allowing, blocking or restricting the use of the applications and websites. Thus, the device access module 435 may include information associated with blacklisting the use of one or more applications or websites.

Embodiments of the action module 436 may include one or more components of hardware and/or software program code for performing actions by the employment status module 470 when appropriate, as determined by the policy management module 432. For example, the action module 436 may be configured to restrict use of at least one data processing electronic device activity on an electronic device of the user based on the change to the security settings for the user. This restriction may be created by sending instructions or an update to the monitoring agent and/or any other devices within an enterprise facility (e.g. firewalls etc.) which would restrict device usage in the manner determined by the policy management module 432.

In various embodiments, the action module 436 may specifically be configured to prevent data exfiltration based on the change to the security settings for the user. For example, the action module 436 may provide instructions to a monitoring agent which may blacklist the use of one or more known data exfiltration applications and/or websites, and/or the downloading of such known data exfiltration applications or websites. The action module 436 may be configured to alert an administrator of the at least one entity that the user has attempted to perform data exfiltration with the electronic device.

Thus, the action module 436 may be configured to originate actions which may be carried out by agent management module 433 associated with restricting data processing electronic device activity on the electronic device of the user based on the change to the security settings for the user. The action module 436 may further be configured to administer and carry out actions which, when implemented, enhance or increase the level of the monitoring of device usage of a monitored device. Likewise, the action module 436 may be configured to facility the performance and implementation of any action described herein attributable to the employment status module.

The employment status module 370 and the action module 363 may be configured to perform actions automatically, immediately and and responsively to the receiving the information indicating the change in the employment status of the user. Thus, the employment status module 370 may be configured to automatically adapt policy and security setting updates immediately and responsively as new employment status information is received.

Referring still to FIG. 4, embodiments of the computer system embodied by the employment status module 470 may be equipped with one or more memory devices 442 which may store the location information, information related to the above described tasks of the employment status module 470, and a processor 441 for implementing the tasks associated with the employment status module 470. The employment status module 470 further includes a data repository 450. The data repository 450 may be a data collection area within a threat management facility. The data repository 450 may be a dedicated data repository associated with the employment status module 470, but may also be a combination of one or more data repositories of the various sub-facilities of the threat management facility within which the employment status module 470 is employed (e.g. the data repositories 350), or a combination thereof.

Figure 5:
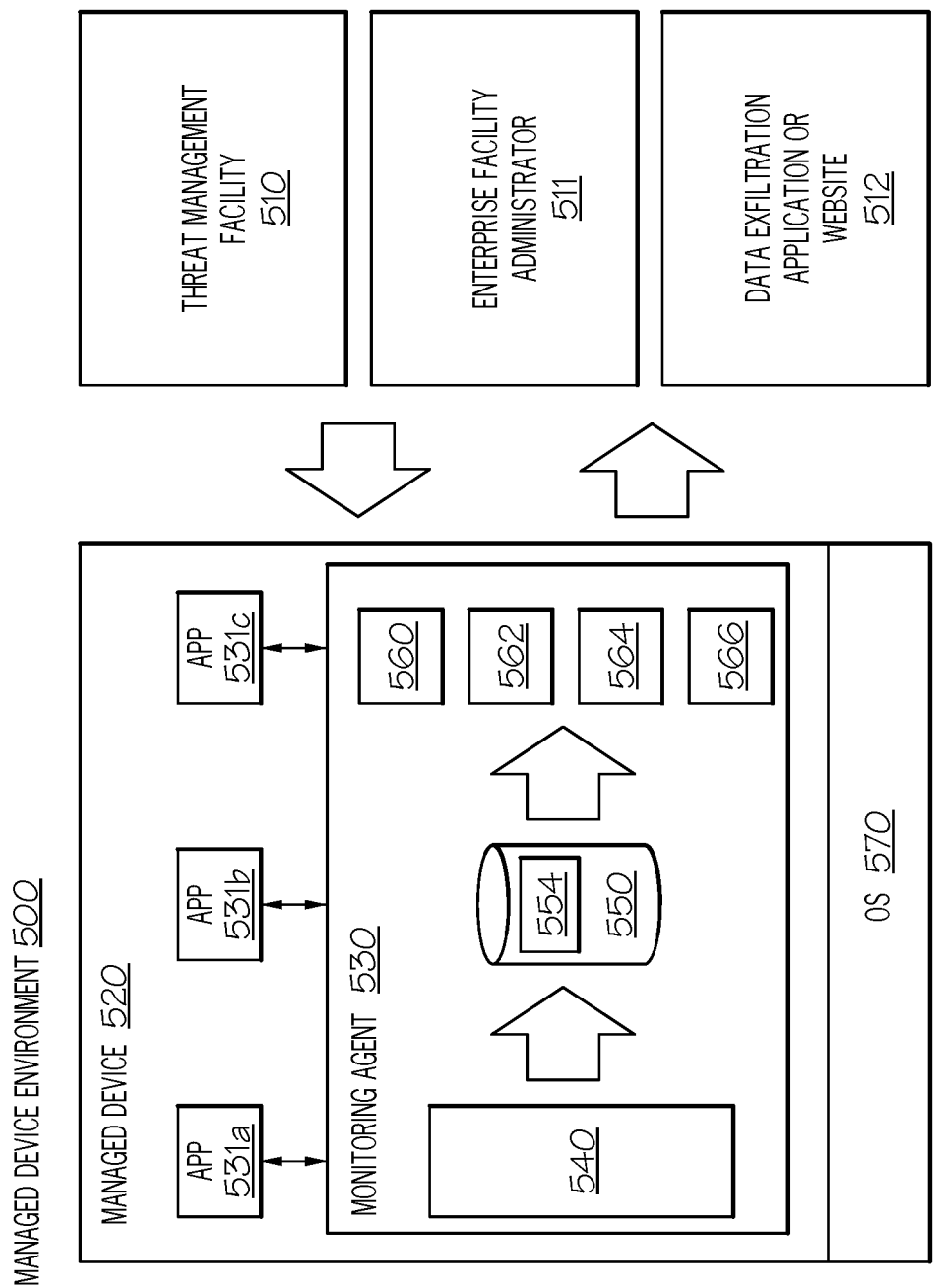
FIG. 5 depicts a managed device environment according to an example embodiment.

FIG. 5 depicts a managed device environment 500 in accordance with an example embodiment. As shown, the managed device environment includes a managed device 520, such as an end point, compute instance, user device or the like running an operating system 570. The managed device 520 is connected, for example, over a network, to a threat management facility 510 (which may be the same or similar to the threat management facilities 100, 301 described hereinabove), an enterprise facility administrator associated with an enterprise facility, and an external data exfiltration application or website 512. The managed device 520 may be a device that is part of the enterprise facility (not shown) overseen by the enterprise facility administrator, or may be an external mobile device, endpoint or compute instance (such as the mobile device 26).

The managed device 520 may include a monitoring agent 530 which includes various features including an event detecting feature 540 that produces data, which are recognized as events by the monitoring agent 530, the threat management facility 510 and the employment status module. The event detecting feature 540 of the monitoring agent 530 may be thus a source of event information.

The monitoring agent 530 may be an application or software which operates at an application layer on the managed device 520 and may be in operable communication with other applications 531*a*, 531*b*, 531*c* or processes running on the managed device 520. The monitoring agent 530 may be an application which is deployed by the threat management facility 510, and may be in continual or regular communication with the threat management facility 510.

The information gathered by the monitoring agent 530 may relate to device usage of the managed device 520, particularly as the device usage relates to the other applications 531*a*, 531*b*, 531*c* or processes running on the managed device. While not shown, the monitoring agent 530, and the event detecting feature 540 thereof, may be embodied by a software process, but may also include hardware (sensors) or other devices, or be embodied by a combination of hardware and software. The device usage may particularly pertain to instances when a user uses the device in a manner relating to data exfiltration and/or data downloading. For example, device usage may relate to a user downloading or otherwise using one of the applications 531a, 531b, 531c or the external data exfiltration application or website 512. Device usage may further pertain to instances when the user attempts to use the device to download sensitive information from the enterprise facility associated with the managed device 520.

The output of the monitoring agent 530 may be recognized as events 544. There may be many events provided by the monitoring agent 530. The events may be processed by a local event processing facility 554 of the monitoring agent 530. The event processing may perform processing and tokenization, if necessary. Some events may be recognized and evaluated in real-time, other events may be evaluated in the context of other events. Processing of the events include, without limitation, stream processing and/or bulk processing. Events may have attributes, or associated contextual information (e.g., mandatory, optional (e.g., best effort), sensitive (e.g., tokenize it in local event store). One or more of the events may be sent in real time and may be stored locally. Locally stored events may be retrievable by the local event processing facility 554 for further processing and/or communication. The events may be determined to be of interest based on policies put in place related to employment status of a user account associated with the managed device 520.

A local event recorder 550 may be part of the local event processing facility 554. Some recorded events may be stored locally, whereas some may be communicated to another compute instance, such as the threat management facility 510 and/or the employment status module. An event filter 562 may be used to parse the events locally. Local analytics 564 on the managed device 520 may be used to locally identify events of interest. A communication facility 560 of the managed device 520 and/or monitoring agent 530 communicate events to a threat management facility 510, which may be a cloud facility.

Local enforcement 566 may be used to take steps in response to events, as determined by the policy management facility of the threat management facility 510. The threat management facility 510 may communicate changes or updates to the local enforcement 566 based on determinations and changes of security settings and/or user policies made using the employment status module at the threat management facility 510, as described above. Alternatively, the local enforcement 566 may be updated based on local policies or rulesets that are incorporated into the local monitoring agent 530 and processed locally at the local event processing facility 554. This local processing by the monitoring agent 530 may allow the monitoring agent 530 to perform some or all of the functions of the threat management facility 510 and the associated employment status module locally without external connection or interaction with the threat management facility.

The local enforcement 566 may facilitate in the blacklisting of applications and/or websites or otherwise restrict usage of the monitored device 520. The local enforcement 566 may be configured to implement or execute the steps necessary to prevent data exfiltration using the applications 531a, 531b, 531c and/or the external data exfiltration application or website 512. Thus, the local enforcement 566 facilitate in preventing entire applications and/or websites or simply in the preventing certain functionality associated with those applications and/or websites, depending on the security settings and/or user policies.

FIG. 6 depicts an event collection environment 600 in accordance with an example embodiment. The event collection environment 600 may be used to receive and store events from various managed devices, endpoints or compute instances. Events are received at a threat management facility 610 by event collection 662. Events may be received from managed devices, shown for the sake of clarity of illustration as a managed device 611 having a security or monitoring agent S, an enterprise facility administrator 612, and a managed device 613 having a security or monitoring agent S, and/or a marketplace provider 680, although events may be received from any number or type of managed devices. Events may be stored in the event store 664, and also may be processed in real-time by the processing facility 666. The employment status module 670 may be used to make observations and inferences based on the events, and support the automatic and responsive policy changes to security settings associated with user accounts based on the received events. The employment status module 670 may operate in conjunction with various facilities of the threat management facility 610, including security management 671, policy management 672 and network access 673 in order to provide for the functionality of restricting device activity based on the employment status of a user.

Received events from managed devices 611, 613 may relate to device usage, applications operating on the operating system of the managed devices, websites visited by the managed devices, policy changes made locally by the monitoring agent, or any other monitoring or security information sent by the managed devices 611, 613 to the threat management facility 610. Received events from the enterprise facility administrator may relate to policy or security settings associated with user or device accounts made at the administrator level of the enterprise facility. Received events from the marketplace provider, which may be, for example, a third party human resources software or service, may relate to changes to employment status associated with a given user account, which may be received by the threat management facility for automatic processing by the employment status module 670.

FIG. 7 depicts a policy management table 700 in accordance with an example embodiment. The policy management table 700 may be representative of a table used by the employment status module, as described herein, containing rules and status information associated with various users and user devices. The policy management table 700 may incorporate the data used by the employment status module, as described herein. While the policy management table 700 is shown as a single table, it should be understood that the employment status module may architecturally utilize any number of tables with any number of rows and columns for deploying the rules and algorithms and models described herein. Moreover, while the particular columns shown illustrate one embodiment of the types of data relied upon by the employment status module, various other types of data associated with categories of information are contemplated.

In some embodiments, the policy management table 700 may be a table compiled using, at least in part, data taken from data repositories associated with various different sub-facilities within a threat management facility. For example, the employment status module may be configured to use data from a policy management facility, such as the policy management facility 112, 312, including data associated with permissions and policies. Similarly, the employment status module may be configured to use data from a network access facility, such as the network access facility 124, 324, such as block lists, white lists, black lists, and the like. The employment status module may be similarly configured to use data from entity models, such as the entity model facility 162, 362, associated with entity models defining groups, roles, permitted activities and other attributes related to entities and/or users thereof.

As shown, the policy management table 700 includes six columns: a user column 702, a device(s) column 704, an entity column 706, an employment status column 708, a security settings column 710 and a user setting 712 column. The policy management table 700 includes six different primary rows associated with six different users 1-6.

The first column 702 relates to the user column. The users 1-6 may represent user accounts, which may be stored by the threat management facility pursuant to various other security offerings provided by the treat management facility, and retrieved therefrom by the employment status module for the population of the first column 702. Alternatively, the first column 702 may be generated by the employment status module in accordance with a specific data entry during the setting up of the employment status module for a particular enterprise facility.

Each user shown in column 702 may include one or more devices associated with the user account, shown in the second column 704. For example, as shown, users 1, 3 and 6 each include two separate devices. The devices listed in the second column 704 may each be devices associated with each user which a monitoring agent, as described above, is deployed thereon.

The users provided in the first column 702 may relate to different enterprise facilities, customers, or clients, in some embodiments. As shown in the third column 706, the entity model may store information associated with which entity (i.e. enterprise facility, customer or client), a user is associated with. In the embodiment shown, the policy management table 700 provides six different users spanning across two different entities.

The fourth column 708 is shown, which keeps track of employment statuses for each of the user accounts. This employment status information may be input directly by an administrator of the threat management facility or the enterprise facility, or may be automatically acquired or scraped from a human resources marketplace provider third party platform, or the like. Employment statuses shown include employed, departing, or terminated, but these are non-limiting examples. The various employment statuses associated with each user profile are particularly used by the employment status module in order to determine security settings and/or user settings, as shown in columns 710, 712.

The fifth column 710 shown are codes associated with particular security settings associated with each user profile. These security settings relate to the employment status, and may be generated pursuant to an algorithm, ruleset, or model as provided by the employment status module. In some cases, the security settings in the fifth column 710 are associated with a given user account, such as an E1 ruleset (i.e. employed, first setting) of the first user. The denotation E1 may be representative of any denotation calling back to one or more security settings stored in the employment status module associated with a particular employment status. In this case, the E1 ruleset may be applied across the entire employee account, regardless of the user device. In other cases, the security settings may be more particularly tailored by device. For example, user 3, who is departing, has a D1 ruleset (departing, first setting) when using a first device, but may include a D2 ruleset (departing, second setting) when using a second device. A ruleset may correspond to both an employment status, (i.e. the letters for each of the security settings correspond to the employment status), but there may be variations for each setting depending on a plurality of other features associated with a given user account. For example, if a departing user at a management level may have a different ruleset relative to a departing user at a staff level. Thus, while a change in employment status will generally trigger a change in a ruleset by the employment status module, different employees at different levels and in different situations may be treated differently, even sharing the same employment status.

Finally, an additional user setting is shown in a sixth column 712. The sixth column 712 includes, for example, a monitoring status associated with a degree of monitoring. This user setting may be either related or unrelated to an employment status, and may escalate based on received events and user activity. While the policy management table 700 may include three different monitoring settings, of low, medium, and high, these are exemplary.

While the policy management table 700 shown provides an example of a data table which may be compiled and used by algorithms, rules or models of the employment status module, any amount of data may be used by the employment status module. Whatever data utilized, security settings and security policy may be considered to automatically change across each row (user profile) when a change is received or made to the employment status column (i.e. the fourth column 708 shown in the policy management table 700).

FIG. 8 depicts a system 800 for monitoring user status and response in accordance with an example embodiment. In general, the system may include one or more monitored devices 802 that use local monitoring agents 808 to gather events 806, which may be expressed data, vector data, or the like. The monitored devices 802 and/or monitoring agents 808 thereof may then report these events 806 to a threat management facility 812. The threat management facility 806 may store the events 806 as a data stream 814 in a data repository 816 such as one or more memory spaces or other data stores of the threat management facility 812. The event stream 814 may be analyzed with the employment status module 820 and/or the interactions with the various sub-facilities of the threat management facility 812.

The monitored devices 802 may be any of the types of monitored devices and/or user devices or compute instances described herein, including without limitation any physical device such as a laptop, desktop, gateway, router, firewall, smartphone, tablet, or the like, as well as a virtualized instance of any of the foregoing or any other computer, user device, container or the like. The events 806 may also generally be any of the events described herein. The monitoring agent 808 may be any of the security or monitoring agents described herein, or any other software component or the like executing on or in association with one of the monitored devices 802 to locally manage monitoring and security of monitored device and/or coordinate security and monitoring services with the threat management facility 812 and other remote resources.

The local monitoring agent 808 may collect events 806 from sensors or any combination of software and hardware systems operable on the monitored device 802, and form the collected events 806 into event vectors, where applicable, for communication to the threat management facility 812. The local monitoring agent 808 may process events 806 in a variety of of ways in order to facilitate communication, computational efficiency, or downstream processing. For example, the local monitoring agent 808 may tokenize the collected events 806. That is, a process that causes or creates an event 1406 may be assigned a number or other identifier, which may be used locally by a compute instance or globally within the enterprise to identify a particular, known process. An event 806 may also encode (tokenized or otherwise) a relationship among different processes. For example, for a particular process that caused an event 806, a parent-child relationship or other dependency with other processes may be encoded by providing process identifiers or the like within the event 806, along with information characterizing the relationship among the processes. A Uniform Resource Locator or other information for identifying resources or network locations may also be tokenized or otherwise processed to support efficiency, consistency and the like. For example, a URL may be encoded in an event 806 as a hash of a URL, or as a portion of a URL, or some combination of these (e.g., a literal encoding of the top level domain, and a hash of some or all of the remaining path information). Other events 806 such as registry changes, system calls, remote procedure calls and the like may be literally encoded into an event 806 where they are relatively compact, or identified using any suitable tokenization, compression, or the like.

Other techniques may also or instead be used. For example, user-specific or machine-specific information may be altered where appropriate to anonymize the events 806 and mitigate exposure of sensitive information during network communications. An event vector or individual events 806 therein, may also or instead be encrypted in order to secure the contents against malicious interception. In another aspect, the events 806 may be compressed to conserve network resources. The events 806 may also or instead be prioritized, e.g., in order to increase sensitivity and decrease response times for events 806 associated with a high likelihood of unwanted activity or data exfiltration. In this latter aspect, the local monitoring agent 808 may locally analyze events 806 in order to permit suitable prioritization, as well as to support local detection and response to malicious, or potentially malicious activity.

It will also be appreciated that events 806 may usefully be labelled in a variety of ways. While labeling with process identifiers is described above, this may also or instead include an identification of an entity associated with the event 806. In this context, the entity may be any physical, logical, or conceptual entity useful for monitoring activity of the monitored devices 802 as described herein. For example, the entity may include a user, a physical device, a virtualized machine, an operating system, an application, a process, a hardware subsystem (e.g., a network interface card, USB drive, camera, etc.), a network resource, a domain controller, a remote software service, and so forth. It should also be understood that the various entity types may be concurrently associated with a particular event 806, or particular events 806 may be associated with multiple entities or event vectors. Thus for example, storing or downloading a file may be an event 806 associated with a particular user, a particular device or machine, a particular operating system, a particular physical storage device, and so forth. Similarly, attempting to perform data exfiltration may, access a data exfiltration application or website, or attempting to download a data exfiltration application or website may be an event 806 associated with a particular user, a particular device or machine, a particular operating system, a particular physical storage device, and so forth.

In general, the source of each event 806, such as a particular sensor, or some entity, computing object or the like associated with the event 806, may be encoded with the event 806 to permit explicit identification by the threat management facility 812 or other downstream processing resources. Although depicted as having similar size, it will also be understood that the events vector 806 may contain data or comprise event vectors of any size, and may usefully encode any number of different events 806.

The events 806 may be received by the threat management facility 812 and stored as an event stream 814 in a data repository 816, which may be any data store, memory, file or the like suitable for storing the events 806 or event vectors. The events 806 may be time stamped or otherwise labeled by the threat management facility 812 to record chronology. The event stream 814 may be used for analysis and detection as further described herein. In general, an employment status module 820 may analyze the event stream 814, in accordance with the methods, architecture, process steps and embodiments described herein, and produce actions 850 deployable on the monitored devices 802 and other facilities or devices of the threat management facility 812 in order to prevent data exfiltration based on a user employment status, as described herein.

While not shown, events received from devices other than monitored devices are also contemplated, which can be stored at the data repository 816 and processed as part of the event stream 814 at the threat management facility 812. For example, a change in employment status event may be provided in the event stream 814 by an administrator of an enterprise facility, an administrator of a threat management facility, or a marketplace provider.

Figure 9:
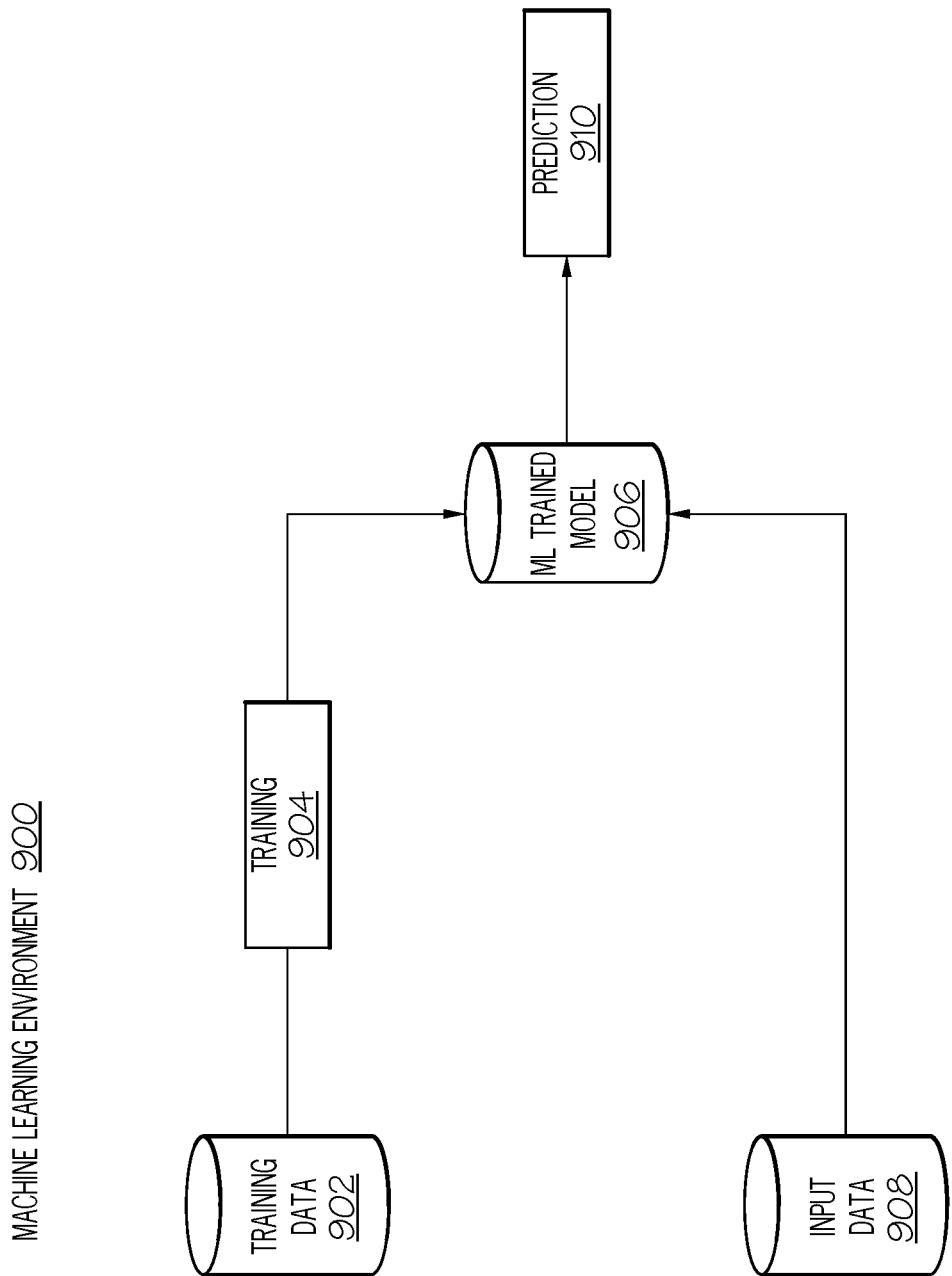
FIG. 9 depicts a machine learning environment according to an example embodiment.

FIG. 9 depicts a machine learning environment 900 in accordance with an example embodiment. The machine learning environment 900 includes training data 902 provided for training 904 of a machine learning trained model 906 for outputting a prediction 910. As contemplated herein, the machine learning may be deployed to predict a likelihood of a user to attempt to perform unauthorized data exfiltration, based on the machine learning trained model 906. The machine learning trained model 906 may also further predict a likely response to a received event, for example. Still further, the machine learning trained model 906 may suggest or deploy a user policy, security settings, or the like, based on the prediction 910 output by the machine learning trained model 906.

The training data 902 may be a data set of example instances of employment statuses, security settings associated with employment statuses, user statuses, received information from monitoring agents related to historical device usage, and any historical responses to that received information include actions taken, monitoring escalations or the like. The training data may be data unrelated to the enterprise facility, customer or client, and may be initial data from which the threat management facility, employment status module and/or machine learning model thereof, may learn from. In other embodiments, the training data may be accumulated from real data over time as the systems run pursuant to the above described approaches.

As shown, once the machine learning trained model 906 is trained, input data 908 may be provided to the machine learning trained model 906, which may output predictions based on the learned model. As described, the prediction 910 may relate to a likelihood of a user to attempt to perform unauthorized data exfiltration, a likely response to a receive event, or a likely desired security setting or desired degree of monitoring based on learned historical preferences.

The machine learning trained model 906 may, for example, be vector representations or the like of different events expected for or associated with a user or enterprise facility, and may also include information about the frequency, magnitude, or pattern of occurrence for each such event. As events are collected, a statistical model or the like may be developed for each event represented within the machine learning trained model 906 so that a baseline of expected activity can be created. In one aspect, an existing model may be used for the machine learning trained model 906, e.g., when the user or enterprise facility is already known and well characterized. The entity model may also or instead be created by observing activity by a user or enterprise facility over time. This may include, for example, monitoring the entity for an hour, for a day, for a week, or over any other time interval suitable for creating a model with a sufficient likelihood of representing ordinary behavior to be useful as a baseline as contemplated herein. It will also be understood that, once the machine learning trained model 906 is created, it may usefully be updated, which may occur at any suitable intervals according to, e.g., the length of time to obtain a stable baseline, the amount of activity, or any other factors.

Once the machine learning trained model 906 has been created and a stable baseline established, the machine learning trained model 906 may be deployed for use in monitoring prospective activity of users and monitored devices and suggesting appropriate activity based on received events. This monitoring may, for example, use the same event stream 814 described hereinabove. It will be appreciated that the machine learning trained model 906 may generally be deployed as fixed or relatively static or discrete models, or any one or more of the machine learning trained models 906 may be continuously updated so that they change over time as new information becomes available, e.g., in the event stream 814 or otherwise.

The employment status modules described herein may compare new events 806 generated by a monitored device, as recorded in the event stream 814, to the machine learning trained model 906 that characterizes a baseline of expected activity. This comparison may usefully employ a variety of vector or similarity measures known in the art. For example, the comparison may use one or more vector distances such as a Euclidean distance, a Mahalanobis distance, a Minkowski distance, or any other suitable measurement of difference within the corresponding vector space. In another aspect, a k-nearest neighbor classifier may be used to calculate a distance between a point of interest and a training data set, or more generally to determine whether an event should be classified as within the baseline activity characterized by the entity model.

Figure 10:
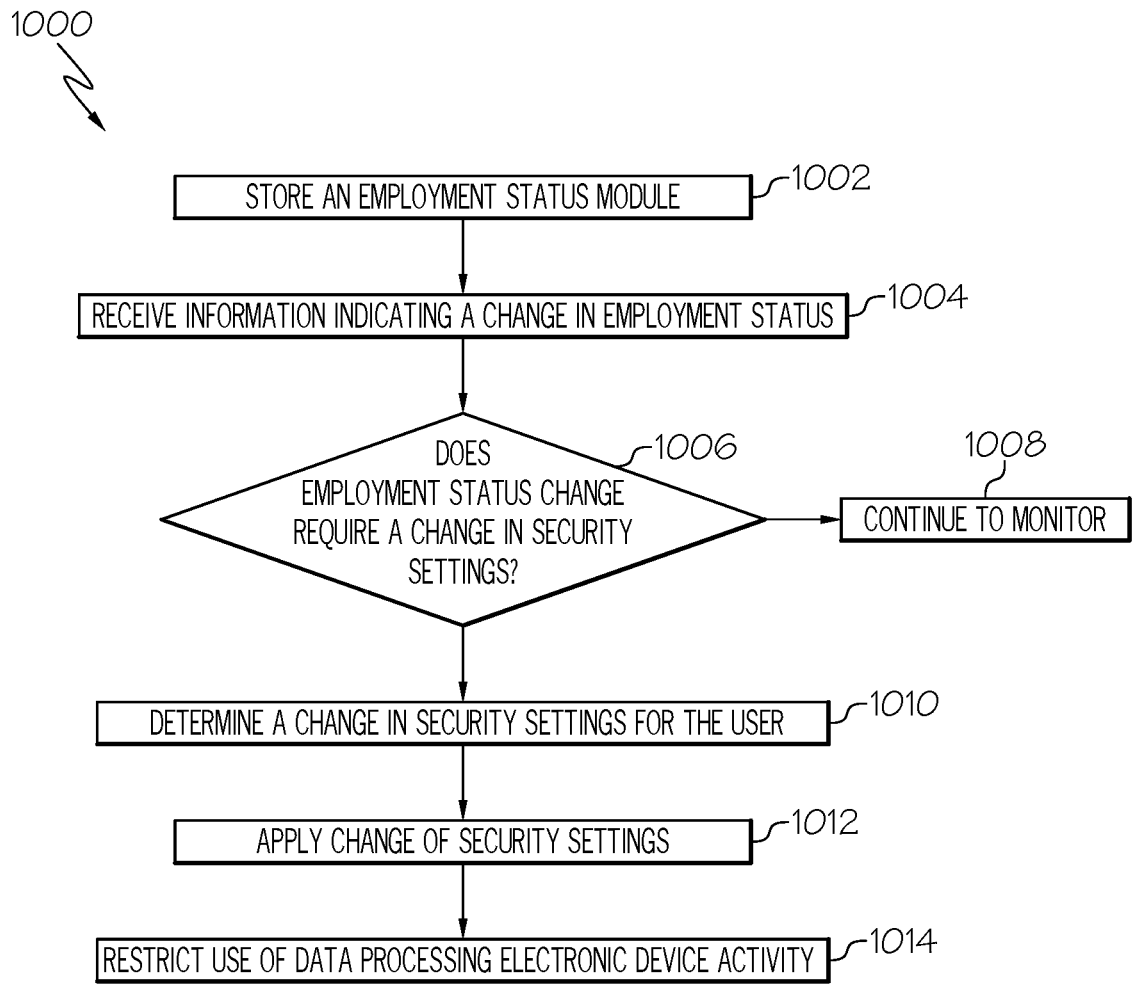
FIG. 10 depicts a method, in accordance with an example embodiment, for monitoring user policies and security settings for electronic device usage based on a user status.

FIG. 10 depicts a method 1000, in accordance with an example embodiment, for monitoring user policies and security settings for electronic device usage based on a user status. The method 1000 may be performable by, for example, the one or more computer systems and/or processors of the threat management facility 100, 301 described hereinabove. This method 1000 may be particularly advantageous in precluding the need for individualizing policy changes when a user is known to have a changed employment status. In particular, the method 1000 includes incorporating an employment status module which automatically, without human intervention, updates policy changes and security settings for a user which can be pushed to a user device and thereby protect or prevent user activity on monitored devices.

As shown in step 1002, the method 1000 may begin with storing an employment status module, such as the employment status module 500 described hereinabove. The employment status module may be provided with a service-oriented architecture, or a microservice container-based architecture. The employment status module may incorporate sub-modules which span across multiple facilities of the threat management facility, such as a security management facility, an update management facility, a policy management facility, a network access facility, an entity model facility, an event collection facility, an event logging facility, and a remedial action facility.

The employment status module may be stored in association with at least one entity, such as a customer, client or enterprise facility. In other embodiments, separate employment status modules may be deployed and stored by the threat management facility for each different customer, client or enterprise facility in the form of a separate compute instance or virtualized instance.

At this step 1002, the rules and/or algorithm associated with the employment status module may be input, provided, coded or otherwise created and stored at the threat management facility. The employment status module may associate a plurality of employment statuses with respective security settings for a plurality of users associated with the customer, client or enterprise facility. For example, employment statuses may include various types of statuses, such as employed, not employed, hired (but not yet employed), furloughed, under contract (contractor), subcontractor, pending termination, pending departure, or the like. Any type of employment status may be contemplated and provided for in the employment status module.

The various employment statuses may be assigned respective security settings within the employment status module. Security settings may particularly relate to the degree of monitoring, the ability to access certain websites and applications, the ability to access data sources of the customer, client or enterprise facility and/or permission status of a user. Each employment status may include a unique associated security setting. In some cases, the security settings may include statuses or settings associated with websites or applications, where the statuses or settings are, for example, whitelist status (allowed) and/or blacklist status (blocked or prohibited). The websites or applications may be websites or applications which provide data exfiltration opportunities if not blacklisted. In other cases, security settings may include statuses related to a degree of monitoring performed by a monitoring agent of the device and/or the threat management facility. In any event, the security settings may relate to data processing and/or data exfiltration activity associated with user accounts and/or the devices or compute instances, or the like, associated with those user accounts.

The method 1000 includes a second step 1004 of receiving information by the computer system and/or the threat management facility, information indicating a change in an employment status of user associated with the customer, client or enterprise facility. The received information may be received in accordance with the event collection environment, described hereinabove. The change in employment status may be provided by a change made by an administrator of the customer, client or enterprise facility to a user account or setting, which is then provided to the threat management facility and/or computer system as described herein in the form of an event. In other embodiments, the change in the employment status may be input by an administrator at the threat management facility.

In still other embodiments, the information may be received from a data scraping agent deployed at an enterprise facility which may be used to automatically determine employment statuses of users based on various other systems associated with the customer, client or enterprise facility. For example, a marketplace provider and/or cloud enterprise facility may be a human resources system provider which already contains data associated with employment status of users of the customer, client or enterprise facility, and may be provided to the threat management facility and/or computer systems thereof in accordance with the step 1004.

At a next step 1006, the threat management facility and/or computer system thereof determines whether an employment status change requires a change in security settings when new information is received. Step 1006 may be an optional step. In some instances, a change in employment status may not require a change in security settings such as a blacklisting of a website or application. In these instances, for example, a change in employment status may not be restrictive in nature (e.g. when an employment status changes from "contractor" to "employed"). If no change in security steps are warranted, at a step 1008 monitoring may continue, either as normal or in an escalated manner. For example, even if no prevention of usage is required by a change in a security setting, it may be possible to escalate monitoring in some manner by the threat management facility.

If it is determined that a change in security settings is required, a step 1010 may include determining a change to security settings for the user based on the change in the employment status of the user. For example, the step 1010 may include interfacing with the employment status module, and algorithms or rules associated therewith, in order to determine what changes to security settings are needed based on the received change in employment status.

At a step 1012, the method 1000 includes applying the determined change of security settings to a user account. Step 1012 may further include the interfacing with a network access facility, which may be a facility associated with actually performing the blocking to parse network access requests and apply the determined policies and security setting changes. Additionally, the step 1012 may include the computer system interfacing with a policy management facility to update a blacklist and/or whitelist associated with user accounts for particular websites and/or applications which may support data exfiltration or other unwanted user activity. At step 1012, the threat management facility and/or computer system thereof may communicate policy and security setting updates to a monitoring or security agent of devices associated with the user.

The step 1012 may further include a step 1014, of restricting the user from engaging in data processing activity on an electronic device associated with the user account and preventing data exfiltration based on the change to the security settings of the user. To accomplish step 1014, the computer system of the threat management facility may send a policy update to the security or monitoring agent on the user device. This policy update may update settings, which when interacted with by the network access facility, prevent the device from engaging in unwanted activity.

The processing at steps 1004-1014 may be performed automatically, immediately and/or responsively to the receiving the information indicating the change in employment status at step 1004. In some embodiments, the processing in steps 1004-1012 may be subject to a real-time constraint and may be conducted in real-time as responsive awareness of the threat management facility and/or computer system thereof to the change in employment status.

Figure 11:
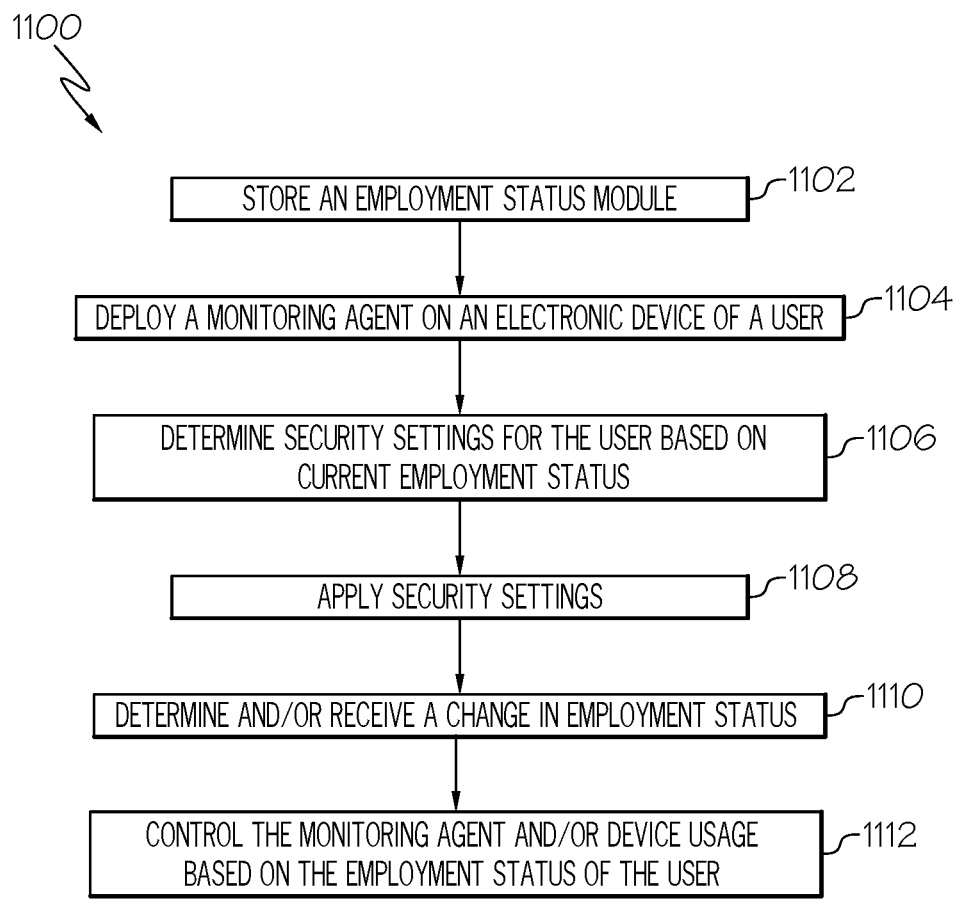
FIG. 11 depicts a method, in accordance with an example embodiment, of deploying a monitoring agent.

FIG. 11 depicts a method 1100, in accordance with an example embodiment, of deploying a monitoring agent. Like the method 1000, the method 1100 may be performable by, for example, the one or more computer systems and/or processors of the threat management facility 100, 301 described hereinabove. The method 1100 may be particularly advantageous in monitoring a user device activity based on an employment status of the user, and in providing event information back to the threat management facility or an administrator of the client device for processing and policy decision making. The method 1100 may further advantageously provide for dynamic monitoring settings based on the employment status of the user. When combined with the method 1000, the method 1100 may further be configured to restrict device usage when a monitoring agent detects device usage which is not permitted by security settings associated with a user.

The method 1100 includes a first step 1102 of storing an employment status module, which may include the methodology and implementation described hereinabove with respect to the step 1002 of the method 1000. In the step 1102, the employment status module may particularly focus on algorithms, a ruleset and/or a trained model pertaining to escalating and de-escalating levels of monitoring provided by the monitoring agent based on employment statuses of users.

The method 1100 includes a second step 1104 of deploying a monitoring agent on an electronic device of a user. In some embodiments, the monitoring agent may be deployed on all devices or endpoints associated with a particular user. Likewise, the monitoring agent may be deployed on any and all devices or endpoints for any number of users associated with a customer, client or enterprise facility. The monitoring agent may be a security agent, application or the like required to run on the device of the user and in regular communication with the threat management facility.

The monitoring agent may be configured to monitor device usage of whatever device or endpoint the monitoring agent is deployed. This device usage information, data or stream of events may be provided in back to the threat management facility pursuant to the environment and architecture described hereinabove. The monitoring agent may also be configured to provide control and security features in order to enable any changes in security settings associated with a user based on the employment status of the user, as described in the method 1000.

The monitoring agent may be deployed with different levels of monitoring based on the status or security settings associated with a given user. For example, in one setting, device activity may not be monitored. In another setting, monitoring may be required. In another setting, device activity may be monitored only when particularly defined activity is being conducted on a monitored device. For example, if a data exfiltration application or website is being accessed or used by the device, the monitoring agent may be configured to provide information related to this event to an administrator of the enterprise facility or to the threat management facility for further processing. Whatever the monitored setting, the setting may be automatically be controlled and updated by the threat management facility responsive to when the employment status module determines that a change in employment status occurs with a given user.

The method 1100 includes a next step 1106 of determining security settings for the user based on a current employment status and then a step 1108 of applying the security settings by the monitoring agent. The step 1106 may be conducted at the threat management facility based on the current employment status of a user. Either before or after the monitoring agent is deployed in the step 1104, the security settings for the individual user may be determined and applied by the threat management facility, thereby configuring the monitoring agent to monitor the device or endpoint upon which the monitoring agent is installed or operating.

At a step 1110, the method 1100 includes receiving information indicating a change in an employment status of a user and/or determining a change in an employment status of a user based on received information. The step 1110 may be the same or similar to the steps 1004 and/or 1010 described previously. In some embodiments, the step 1110 may further include receiving changes to an employment status at the monitoring agent. However, in many cases, the employment status information may be received and processed at the threat management facility at the back end.

After receiving and/or determining a change in employment status, the method 1100 includes a final step 1112 of controlling the monitoring agent and/or device usage based on an employment status of the user and associated security settings for the user as determined during the step 1110. As described previously, the monitoring agent may be controlled in various ways at step 1112 including, but not limited to, by changing a level of monitoring (e.g. increasing or decreasing the amount of information provided back to a system that the monitoring agent is connected to), or by changing a particular device usage control associated with the device being monitored (e.g. ensuring the device is prevented or allowed to access websites or applications, such as those which enable data exfiltration). Pursuant to the controlling, the monitoring agent may be in communication with the threat management facility, or an administrator of an enterprise facility, or the like.

Figure 12:
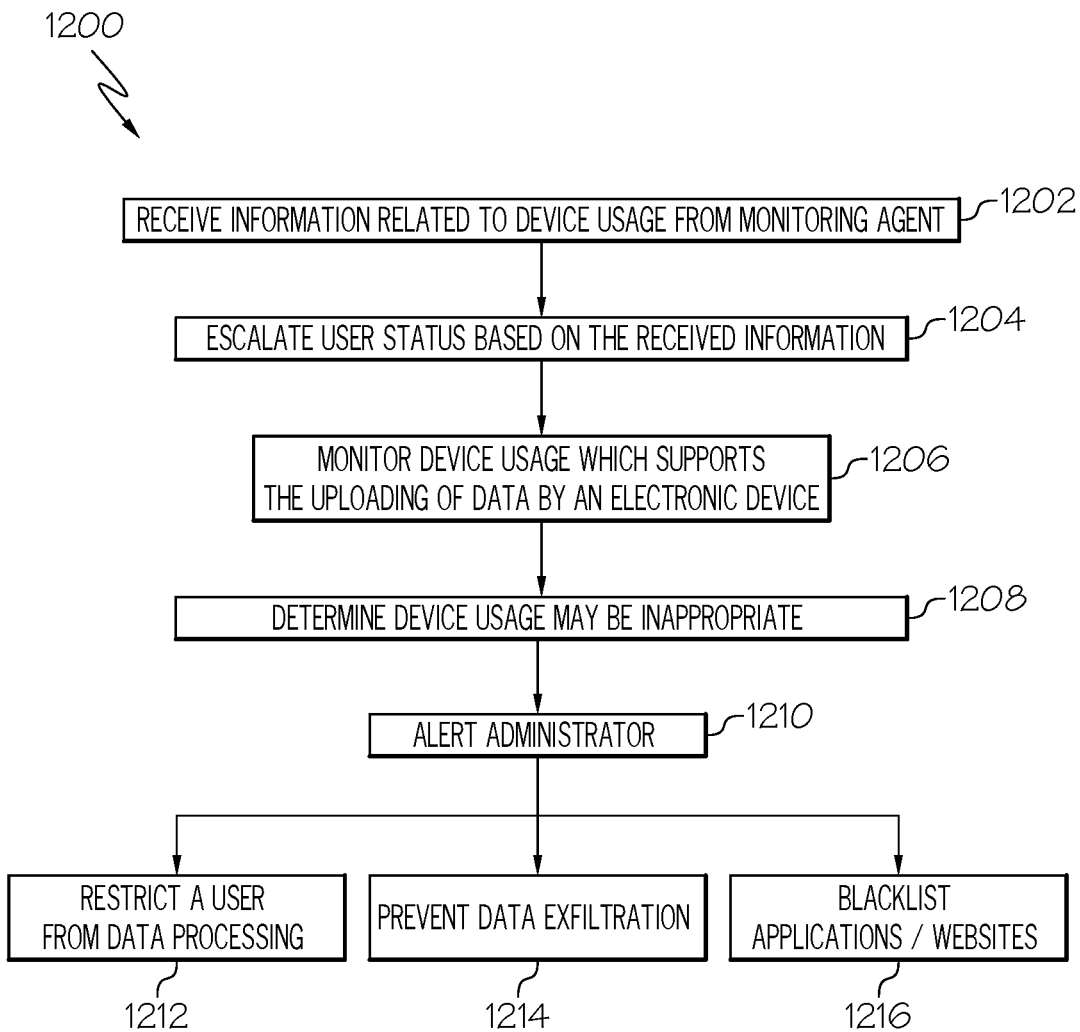
FIG. 12 depicts a method, in accordance with an example embodiment, for preventing data exfiltration based on user status.

FIG. 12 depicts a method 1200, in accordance with an example embodiment, for preventing data exfiltration based on user status. The method 1200 provides one example of a method of escalating monitoring and/or restrictions based on received information and events. While the method 1200 provides one example of an escalation strategy, it should be understood that various strategies are contemplated that incorporate the principles described herein in any combination or order. The method 1200 may occur after a user has been configured up with a particular set of security settings based on employment status, as described above, and these settings have been provided to the monitoring agent. At start of the method 12000, the device is being monitored, either as a baseline level of security, or because an employment status change has necessitated a certain degree of monitoring. However, the device has not yet been restricted.

The method 1200 includes a first step 1202 of receiving information related to device usage from a monitoring agent, for example, deployed on a device being used by a user of an enterprise facility. This receiving of information may occur at the threat management system, or at the monitoring agent locally running at the end point or device of the user. This received information may include an event such as a user downloading an application which provides for data exfiltration, or visiting a web page that provides for data exfiltration, or opening an account for a service which provides for data exfiltration. Events may also relate to downloading information from a system of the enterprise facility, customer or client. For example, if a user begins to download sensitive information from the enterprise facility locally onto their device or endpoint, information related to such an event may be provided by a monitoring agent and received by the threat management facility. Whatever type of information is received, the method may proceed to responding automatically and responsively to this information, as described further below.

Based on this received information, the method 1200 includes a next step 1204 of escalating a user status based on the received information. The user status may relate to a status for a user profile associated the employment status module. For example, the user status may be stored or otherwise saved in a database at the threat management facility (e.g. a policy management facility). This user status may be independent of an employment status, but may relate to an employment status. For example, a user employment status may be "pending departure" (i.e. maybe working within a two week notice of leaving), but a monitoring status associated with this employment status may be escalated from "minimal" to "moderate." The employment status module may include security settings associated with each employment status and user status. Again, the change in the user status may occur automatically and responsively to the new information received related to the event which occurred whereby the information related to this event was received in step 1202.

The method 1200 includes a further step 1206 of monitoring device usage pursuant to the escalation. This monitoring may particularly relate device usage which supports the uploading of data by an electronic device. In other embodiments, an escalation in device usage may relate to the downloading of data by the electronic device, the downloading, installing or using of an application or service, the visitation or interaction with a webpage, or the like.

During the monitoring, the method 1200 includes a next step 1208 of determining that the device usage is not appropriate. This determination may be made by deploying logic, algorithms, rules or models of the employment status module, as to the current security settings of the user based on the employment status and user settings. For example, the step 1208 may be a determination that the user is attempting to upload information to a data exfiltration application or website.

In a next step, the method 1200 includes a step 1210 of sending an alert to an administrator. The administrator may be an administrator of the enterprise facility, customer or client, or may also be an administrator of the threat management facility. Other types of alerts may be provided, for example, directly to the device of the user. Whatever the embodiment, the alerting step may be an optional step of the process, but may be an automated alert that arrives as a pop up window, an email communication, an alert within an administrator alert interface, or the like.

Finally, at steps 1212, 1214 and 1216, various measures may be taken to impact device usage based on the escalation. For example, the method may be used to restrict a user from data processing in particular manners 1212, prevention of data exfiltration 1214 (or even data downloading), or specifically blacklist applications, websites or services 1216. Various device changes may be deployed by the threat management facility, monitoring agent and combinations thereof.

Figure 13:
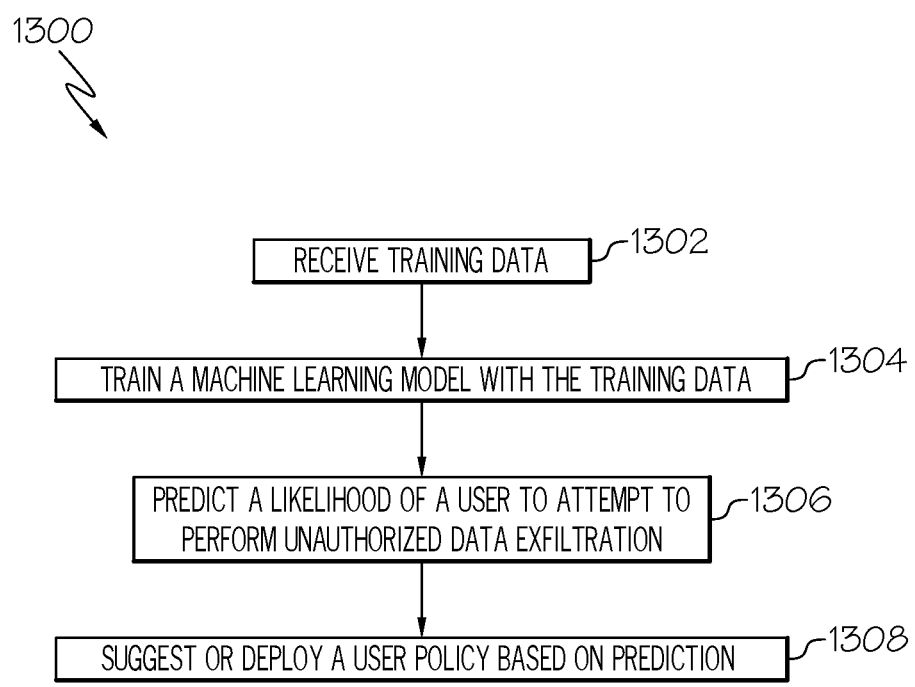
FIG. 13 depicts a method, in accordance with an example embodiment, of predicting a likelihood of a user attempting to perform unauthorized data exfiltration.

FIG. 13 depicts a method 1300, in accordance with an example embodiment, of predicting a likelihood of a user attempting to perform unauthorized data exfiltration. The method 1300 may be particularly advantageous in using machine learning in predicting problematic behavior and/or predicting likely responses or restrictions based on past or historical data. The method 1300 may be implemented by one or more of the foregoing devices and/or systems mentioned previously and is discussed by way of reference thereto.

The method 1300 may include a first step 1302 of receiving training data and a second step 1304 of training a machine learning model with the training data. The training data received may be a data set of example instances of employment statuses, security settings associated with employment statuses, user statuses, received information from monitoring agents related to historical device usage, and any historical responses to that received information include actions taken, monitoring escalations or the like. The training data may be data unrelated to the enterprise facility, customer or client, and may be initial data from which the threat management facility, employment status module and/or machine learning model thereof, may learn from. In other embodiments, the training data may be accumulated from real data over time as the systems run pursuant to the above described approaches.

Whatever the embodiment, it is contemplated that machine learning may be deployed to predict a likelihood of a user to attempt to perform unauthorized data exfiltration, based on a machine learned model, at a step 1306. The machine learning model may also further predict a likely response to a received event, for example. Finally, at a step 1308, the machine learning model may suggest or deploy a user policy, security settings, or the like, based on the prediction.

The methods 1000-1300 are described as separate and distinct methods performable by a computer system in the manner described herein above. However, embodiments may combine various methods and/or steps within methods 1000-1300 into an aggregate methodology which incorporates the steps from one or more of the methods 1000-1300 described herein. For example, the method 1000 may incorporate each of the distinctive steps 1104, 1112, thereby including the deployment of the monitoring agent and the controlling of the monitoring agent. Similarly, the methodology in the method 1000 of applying the changes at step 1012 and restricting data processing in step 1014 may incorporate any and all of the specific methodology of the method 1200. Likewise, the storing of the employment status module 1002 of the method 1000 may further include any of the machine learning methodology described in the method 1300. It will be appreciated that various methodology combinations consistent with the present description are contemplated herein.

In this manner, the foregoing systems, devices, and methods provide a mechanism by which the possibility of data exfiltration is monitored and/or controlled based on the employment status of a user. As a user who has been recently terminated by his or her employer is likely to collect data generated by the employer, which may be sensitive and/or proprietary, the disclosed embodiments provide various means in which such data collection and/or exfiltration may be prevented. The described technologies may be particularly useful where the user may have obtained employment at a competitor of the employer's and the user is attempting to use data from the now-former employer at his or her future employer (i.e., the competitor). These technologies, and others described herein, increase the overall security within an organization's digital environment and reduces the likelihood of improper data exfiltration.

Although the foregoing Figures illustrate various embodiments of the disclosed systems and methods, additional and/or alternative embodiments are contemplated as falling within the scope of this disclosure. For example, in one embodiment, this disclosure provides for a method comprising: storing, by a computer system at a threat management facility, an employment status module associated with at least one entity, where the employment status module associates a plurality of employment statuses with respective security settings for a plurality of users associated with the at least one entity, and the respective security settings relate to data processing electronic device activity by the plurality of users. The method may further include receiving, by one or more processors of the computer system, information indicating a change in an employment status of a user of the plurality of users and determining, by the one or more processors of the computer system using the employment status module, a change to security settings for the user based on the change in the employment status of the user. Still further, the method may include applying, by the one or more processors of the computer system, the change to the security settings for the user in a security management system of the threat management facility and restricting use of at least one data processing electronic device activity on an electronic device of the user based on the change to the security settings for the user.

In another embodiment of the method, a monitoring agent is located on the electronic device of the user, wherein the monitoring agent is configured to monitor device usage of the electronic device and provide information to the computer system related to the monitored device usage.

In a further embodiment of the method, the monitoring agent is configured to restrict the user from engaging in the at least one data processing electronic device activity on the electronic device of the user based on the change to the security settings for the user.

In yet another embodiment, the method includes controlling the monitoring agent, by the one or more processors of the computer system, based on the employment status of the user and the security settings for the user.

In yet a further embodiment, the method includes receiving from the monitoring agent, by the one or more processors of the computer system, information related to device usage of the electronic device by the user and escalating, by the one or more processors of the computer system, a user status of the user based on the received information from the monitoring agent.

In another embodiment of the method, the escalating the user status of the user based on the received information from the monitoring agent comprises: increasing the level of monitoring performed by the monitoring agent.

In a further embodiment of the method, the increasing the level of monitoring performed by the monitoring agent results in the monitoring agent monitoring of data flows to and from the electronic device of the user.

In yet another embodiment, the escalating the user status based on the received information from the monitoring agent comprises: changing the security settings for the user.

In yet a further embodiment, the information related to device usage of the electronic device by the user includes information indicating the user has downloaded sensitive or confidential information from a repository associated with the at least one entity.

In another embodiment, the monitoring agent is configured to monitor device usage which supports the uploading of data by the electronic device, and the restricting use of at least one data processing electronic device activity on an electronic device of the user based on the change to the security settings for the user comprises: preventing, by the one or more processors of the computer system, data exfiltration based on the change to the security settings for the user.

In a further embodiment of the method, preventing data exfiltration based on the change to the security settings for the user comprises: blacklisting, by the monitoring agent, the use of one or more applications or websites.

In yet another embodiment of the method, the restricting the user from engaging in the at least one data processing electronic device activity on an electronic device of the user based on the change to the security settings for the user comprises: informing, by the one or more processors of the computer system, the monitoring agent of the change to the security settings for the user.

In yet a further embodiment, the monitoring agent is configured to provide information to the one or more processors of the computer system related to when the user attempts to perform data exfiltration with the electronic device.

In another embodiment, the method includes alerting, by the one or more processors of the computer system, an administrator of the at least one entity that the user has attempted to perform data exfiltration with the electronic device.

In a further embodiment, the device usage includes application usage, website usage and application installation.

In yet another embodiment, the employment status module maintains a list of applications and websites, and wherein the respective security settings for each of the plurality of employment statuses include settings for allowing, blocking or restricting the use of the applications and websites.

In yet a further embodiment, the employment status module includes a machine learning model, the method further comprises: predicting, by the machine learning model, a likelihood of one or more of the plurality of users to attempt to perform unauthorized data exfiltration; and based on the predicting, suggesting, by the one or more processors of the computer system, a restriction for data processing activity for the one or more of the plurality of users to an administrator of the at least one entity.

In another embodiment, the determining the change to security settings for the user based on the change in the employment status of the user, the applying the change to the security settings for the user in a security management system of the threat management facility, and the restricting the user from engaging in the at least one data processing electronic device activity on an electronic device of the user based on the change to the security settings for the user, are each performed automatically and responsively to the receiving the information indicating the change in the employment status of the user.

In another embodiment, the disclosure provides a computer system including one or more processors; one or more memory devices coupled to the one or more processors; and one or more computer readable storage devices coupled to the one or more processors, wherein the one or more storage devices contain program code executable by the one or more processors via the one or more memory devices to implement a method for changing security settings for a user based on employment status, the method comprising: storing, by the computer system at a threat management facility, an employment status module associated with at least one entity, wherein the employment status module associates a plurality of employment statuses with respective security settings for a plurality of users associated with the at least one entity, and the respective security settings relate to data processing electronic device activity by the plurality of users. The method further includes receiving, by the one or more processors of the computer system, information indicating a change in an employment status of a user of the plurality of users, determining, by the one or more processors of the computer system using the employment status module, a change to security settings for the user based on the change in the employment status of the user. The method still further includes applying, by the one or more processors of the computer system, the change to the security settings for the user in a security management system of the threat management facility, and restricting use of at least one data processing electronic device activity on an electronic device of the user based on the change to the security settings for the user.

In another embodiment, the disclosure provides a computer program product for changing security settings for a user based on employment status, the computer program product comprising: one or more computer readable storage media having computer readable program code collectively stored on the one or more computer readable storage media, the computer readable program code being executed by one or more processors of a computer system to cause the computer system to perform a method comprising: storing, by the computer system at a threat management facility, an employment status module associated with at least one entity, wherein the employment status module associate a plurality of employment statuses with respective security settings for a plurality of users associated with the at least one entity, and the respective security settings relate to data processing electronic device activity by the plurality of users. The method further comprises receiving, by the one or more processors of the computer system, information indicating a change in an employment status of a user of the plurality of users, and determining, by the one or more processors of the computer system using the employment status module, a change to security settings for the user based on the change in the employment status of the user. The method still further comprises applying, by the one or more processors of the computer system, the change to the security settings for the user in a security management system of the threat management facility, and restricting use of at least one data processing electronic device activity on an electronic device of the user based on the change to the security settings for the user.

The above systems, devices, methods, modules, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

The invention claimed is:

1. A method comprising:
    storing, by a computer system at a threat management facility, an employment status module associated with at least one entity, wherein
        the employment status module associates a plurality of employment statuses with respective security settings for a plurality of users associated with the at least one entity, and
        the respective security settings relate to data processing electronic device activity by the plurality of users;

receiving, by one or more processors of the computer system, information indicating a change in an employment status of a user of the plurality of users;

determining, by the one or more processors of the computer system using the employment status module, a change to security settings for the user based on the change in the employment status of the user;

applying, by the one or more processors of the computer system, the change to the security settings for the user in a security management system of the threat management facility;

restricting, by sending instructions to a monitoring agent located on the electronic device of the user, use of at least one data processing electronic device activity of the electronic device of the user in a manner determined by a policy module of the threat management facility on an electronic device of the user based on the change to the security settings for the user; and controlling the monitoring agent, by the one or more processors of the computer system, based on the employment status of the user and the security settings for the user, wherein the monitoring agent is configured to prevent data exfiltration based on the change of security settings for the user by preventing applications and/or websites or functionality associated with those applications or websites in a manner defined by the policy module.

2. The method of claim 1, wherein the monitoring agent is configured to monitor device usage of the electronic device and provide information to the computer system related to the monitored device usage.

3. The method of claim 2, wherein the device usage includes application usage, website usage and application installation.

4. The method of claim 1, further comprising:
receiving from the monitoring agent, by the one or more processors of the computer system, information related to device usage of the electronic device by the user;
escalating, by the one or more processors of the computer system, a user status of the user based on the received information from the monitoring agent.

5. The method of claim 4, wherein the escalating the user status of the user based on the received information from the monitoring agent comprises:
increasing the level of monitoring performed by the monitoring agent.

6. The method of claim 5, wherein the increasing the level of monitoring performed by the monitoring agent results in the monitoring agent monitoring of data flows to and from the electronic device of the user.

7. The method of claim 4, wherein the escalating the user status based on the received information from the monitoring agent comprises:
changing the security settings for the user.

8. The method of claim 4, wherein the information related to device usage of the electronic device by the user includes information indicating the user has downloaded sensitive or confidential information from a repository associated with the at least one entity.

9. The method of claim 1, wherein:
the monitoring agent is configured to monitor device usage which supports the uploading of data by the electronic device.

10. The method of claim 9, wherein preventing data exfiltration based on the change to the security settings for the user comprises:

blacklisting, by the monitoring agent, the use of one or more applications or websites.

11. The method of claim 9, wherein the monitoring agent is configured to monitor websites and applications that support the uploading of data from the electronic device of the user and wherein the monitoring agent is configured to alert an administrator when the user is attempting to upload information.

12. The method of claim 1, wherein the restricting the user from engaging in the at least one data processing electronic device activity on an electronic device of the user based on the change to the security settings for the user comprises:
informing, by the one or more processors of the computer system, the monitoring agent of the change to the security settings for the user.

13. The method of claim 1, wherein the monitoring agent is configured to provide information to the one or more processors of the computer system related to when the user attempts to perform data exfiltration with the electronic device.

14. The method of claim 13, further comprising:
alerting, by the one or more processors of the computer system, an administrator of the at least one entity that the user has attempted to perform data exfiltration with the electronic device.

15. The method of claim 1, wherein the employment status module maintains a list of applications and websites, and wherein the respective security settings for each of the plurality of employment statuses include settings for allowing, blocking or restricting the use of the applications and websites.

16. The method of claim 1, wherein the employment status module includes a machine learning model, the method further comprising:
predicting, by the machine learning model, a likelihood of one or more of the plurality of users to attempt to perform unauthorized data exfiltration;
based on the predicting, suggesting, by the one or more processors of the computer system, a restriction for data processing activity for the one or more of the plurality of users to an administrator of the at least one entity.

17. The method of claim 1, wherein:
the determining the change to security settings for the user based on the change in the employment status of the user,
the applying the change to the security settings for the user in a security management system of the threat management facility, and
the restricting the user from engaging in the at least one data processing electronic device activity on an electronic device of the user based on the change to the security settings for the user,
are each performed automatically and responsively to the receiving the information indicating the change in the employment status of the user.

18. The method of claim 1, wherein the threat management facility is a cloud facility.

19. A computer system, comprising:
one or more processors;
one or more memory devices coupled to the one or more processors; and
one or more computer readable storage devices coupled to the one or more processors, wherein the one or more storage devices contain program code executable by the one or more processors via the one or more memory devices to implement a method for changing security settings for a user based on employment status, the method comprising:

storing, by the computer system at a threat management facility, an employment status module associated with at least one entity, wherein
the employment status module associates a plurality of employment statuses with respective security settings for a plurality of users associated with the at least one entity, and
the respective security settings relate to data processing electronic device activity by the plurality of users;

receiving, by the one or more processors of the computer system, information indicating a change in an employment status of a user of the plurality of users;

determining, by the one or more processors of the computer system using the employment status module, a change to security settings for the user based on the change in the employment status of the user;

applying, by the one or more processors of the computer system, the change to the security settings for the user in a security management system of the threat management facility;

restricting, by sending instructions to a monitoring agent located on the electronic device of the user, use of at least one data processing electronic device activity of the electronic device of the user in a manner determined by a policy module of the threat management facility on an electronic device of the user based on the change to the security settings for the user; and controlling the monitoring agent, by the one or more processors of the computer system, based on the employment status of the user and the security settings for the user, wherein the monitoring agent is configured to prevent data exfiltration based on the change of security settings for the user by preventing applications and/or websites or functionality associated with those applications or websites in a manner defined by the policy module.

20. A computer program product for changing security settings for a user based on employment status, the computer program product comprising:
one or more computer readable storage media having computer readable program code collectively stored on the one or more computer readable storage media, the computer readable program code being executed by one or more processors of a computer system to cause the computer system to perform a method comprising:

storing, by the computer system at a threat management facility, an employment status module associated with at least one entity, wherein
the employment status module associate a plurality of employment statuses with respective security settings for a plurality of users associated with the at least one entity, and
the respective security settings relate to data processing electronic device activity by the plurality of users;

receiving, by the one or more processors of the computer system, information indicating a change in an employment status of a user of the plurality of users;

determining, by the one or more processors of the computer system using the employment status module, a change to security settings for the user based on the change in the employment status of the user;

applying, by the one or more processors of the computer system, the change to the security settings for the user in a security management system of the threat management facility;

restricting, by sending instructions to a monitoring agent located on the electronic device of the user, use of at least one data processing electronic device activity of the electronic device of the user in a manner determined by a policy module of the threat management facility on an electronic device of the user based on the change to the security settings for the user; and controlling the monitoring agent, by the one or more processors of the computer system, based on the employment status of the user and the security settings for the user, wherein the monitoring agent is configured to prevent data exfiltration based on the change of security settings for the user by preventing applications and/or websites or functionality associated with those applications or websites in a manner defined by the policy module.

* * * * *